(12) United States Patent
Ishino et al.

(10) Patent No.: US 10,049,547 B2
(45) Date of Patent: Aug. 14, 2018

(54) SOUND RECOGNITION THEFT PREVENTION SYSTEM

(71) Applicant: I & T TECH CO., LTD., Osaka (JP)

(72) Inventors: Renshiro Ishino, Hyogo (JP); Katsuhiko Asada, Hyogo (JP)

(73) Assignee: I & T TECH CO., LTD., Osaka (JP)

( * ) Notice: Subject to any disclaimer, the term of this patent is extended or adjusted under 35 U.S.C. 154(b) by 0 days.

(21) Appl. No.: 15/544,273

(22) PCT Filed: Jan. 27, 2016

(86) PCT No.: PCT/JP2016/052270
§ 371 (c)(1),
(2) Date: Jul. 18, 2017

(87) PCT Pub. No.: WO2016/121793
PCT Pub. Date: Aug. 4, 2016

(65) Prior Publication Data
US 2018/0005501 A1    Jan. 4, 2018

(30) Foreign Application Priority Data

Jan. 27, 2015 (JP) ................................ 2015-012858
Jan. 30, 2015 (JP) ................................ 2015-016184
(Continued)

(51) Int. Cl.
*G08B 13/14* (2006.01)
*G08B 13/24* (2006.01)
(Continued)

(52) U.S. Cl.
CPC ...... *G08B 13/2431* (2013.01); *E05B 73/0017* (2013.01); *G08B 13/1672* (2013.01); *G01V 15/00* (2013.01)

(58) Field of Classification Search
CPC ............ G08B 13/1445; G08B 13/2434; G08B 13/2448; G08B 13/2431; G08B 13/1672; E05B 73/0017
(Continued)

(56) References Cited

U.S. PATENT DOCUMENTS

| | | | |
|---|---|---|---|
| 4,686,513 A | 8/1987 | Farrar et al. | |
| 2008/0303670 A1* | 12/2008 | Seidel ................ | G08B 13/2434 340/572.1 |

(Continued)

FOREIGN PATENT DOCUMENTS

| | | |
|---|---|---|
| JP | 62-174899 | 7/1987 |
| JP | 3099107 | 8/2000 |

(Continued)

OTHER PUBLICATIONS

International Search Report in corresponding PCT application No. PCT/JP2016/052270, dated Apr. 19, 2016.
(Continued)

*Primary Examiner* — Thomas Mullen
(74) *Attorney, Agent, or Firm* — Fildes & Outland, P.C.

(57) ABSTRACT

The present invention includes a self-sounding theft prevention tag that issues one of two different sounds, that is, a first alarm or a second alarm in the event of theft, so that an abnormal state where a theft has occurred is detected with sound in a remote location without being interrupted by electromagnetic noise.

20 Claims, 22 Drawing Sheets

(30) Foreign Application Priority Data

Feb. 17, 2015 (JP) .............................. 2015-000714 U
Feb. 24, 2015 (JP) .............................. 2015-000837 U

(51) Int. Cl.
*E05B 73/00* (2006.01)
*G08B 13/16* (2006.01)
*G01V 15/00* (2006.01)

(58) Field of Classification Search
USPC .................................. 340/572.1, 572.7, 571
See application file for complete search history.

(56) References Cited

U.S. PATENT DOCUMENTS

2009/0033497 A1* 2/2009 Wyatt, Jr. .......... G08B 13/2434
340/572.1
2011/0273295 A1* 11/2011 Sayegh .............. G08B 13/2431
340/572.1

FOREIGN PATENT DOCUMENTS

| JP | 2000-348270 | 12/2000 |
|---|---|---|
| JP | 3138429 | 12/2000 |
| JP | 2006-254376 | 9/2006 |
| JP | 2008-99007 | 4/2008 |
| JP | 5489927 | 3/2014 |
| JP | 3197404 | 4/2015 |
| JP | 3201620 | 11/2015 |

OTHER PUBLICATIONS

English language machine translation of JP 3138429.
English language machine translation of JP 5489927.
English language machine translation of JP 3099107.
English language machine translation of JP 2000-348270.
English language machine translation of JP 2008-99007.
English language machine translation of JP 2006-254376.
English language machine translation of JP 3197404.
English language machine translation of JP 3201620.

* cited by examiner

ID=0,1,2
FIRST ALARM
    F=F(ID)=3.1kHz+50Hz × ID
    T1=T1(ID)=70ms+5ms × ID
    T2=T2(ID)=180ms+5ms × ID

SECOND ALARM
    F=F(ID)=3.6kHz+50Hz × ID
    T1=T1(ID)=50ms+5ms × ID
    T2=T2(ID)=150ms+5ms × ID

SOUND RECOGNITION THEFT PREVENTION SYSTEM

TECHNICAL FIELD

The present invention relates to a sound recognition theft prevention system and relates to a technique of identifying alarms issued from a self-sounding theft prevention tag.

BACKGROUND ART

For example, a theft prevention system of the related art is described in Patent Literature 1. The theft prevention system includes a self-sounding sensor tag serving as a theft prevention sensor and a transmit/receive antenna that is a separate member of the self sounding sensor tag.

The self-sounding sensor tag includes a theft detection unit that detects the preliminary activities of theft and an alarm output unit that outputs an alarm when the theft detection unit detects a preliminary activity of a theft. The transmit/receive antenna includes an alarming detection unit that detects electromagnetic noise generated by the alarm output unit and an auxiliary alarm output unit that outputs an alarm signal when the alarming detection unit detects electromagnetic noise.

Moreover, the theft detection unit receives an activation indication signal, which is wirelessly transmitted from the transmitter of the transmit/receive antenna, through a receiver, thereby detecting a preliminary activity of a theft.

An anomaly detector described in Patent Literature 2 includes a frequency analysis unit that determines, through frequency analysis, a frequency component of a sound feature included in an alarm to be detected, and a similarity detection unit that determines a similarity between a time variation pattern indicating the time variation of a frequency component of a sound feature in a sound feature period outputted by the frequency analysis unit and a time variation pattern in a period preceding the sound characteristic period. The anomaly detector detects an alarm according to the magnitude of the output of the similarity detection unit.

Patent Literature 3 discloses a configuration in which a resonant circuit including a resistor, a capacitor, and a coil resonates as a receiving circuit of a theft prevention tag and a transistor is driven by a resonant voltage.

Patent Literature 4 discloses a configuration in which a received signal inputted from an antenna is amplified in a signal amplification unit to adjust the receiving sensitivity of a theft prevention tag, and the bias voltage of a transistor of an input circuit is adjusted so as to adjust radio receiving sensitivity.

Patent Literature 5 discloses a receiving circuit including an LC resonator having a oil and a capacitor that are connected in parallel to receive a high frequency signal outputted from an antenna. The receiving circuit receives an excitation signal to perform security operations including alarming.

CITATION LIST

Patent Literature

Patent Literature 1: Japanese Patent No. 3138429
Patent Literature 2: Japanese Patent No. 5489927
Patent Literature 3: Japanese Patent No. 3099107
Patent Literature 4: Japanese Patent Laid-Open No. 2000-348270

Patent Literature Japanese Patent Laid-Open No. 2008-99007

DISCLOSURE OF THE INVENTION

Technical Problem

In the configuration of Patent Literature 1, the noise detection antenna serving as the alarming detection unit detects electromagnetic noise generated from a buzzer serving as the alarm output unit of the self-sounding sensor tag. Thus, in the presence of electromagnetic noise sources such as a lighting unit, an electrical apparatus, and a power supply line, the electromagnetic noise of the sources may prevent the noise detection antenna from receiving electromagnetic noise generated from the alarm output unit of the sensor tag.

Moreover, electromagnetic noise generated from the buzzer of the self-sounding sensor tag has quite a small output and thus can be received at a distance of about 2 m by the noise detection antenna. In addition, the receiving antenna has a large size of 30 cm (width)*1.5 m (height). Thus, in the case of a wide store entrance, a large number of noise detection antennas needs to be disposed at the store entrance according to the distance within which the antenna is able to receive. This may spoil an aesthetic appearance near the store entrance, leading to degraded images of high-class stores and so on.

In a theft prevention tag of the related art, the output of a resonant circuit (receiving antenna) is typically received by a transistor. The operating current of the transistor is set at about 1 µA to suppress the current consumption of the transistor. Unfortunately, the current amplification of the transistor decreases in the operating region of the transistor and thus reduces the receiving sensitivity of the receiving antenna of the theft prevention tag to about 80 mV.

A comparator used for a detector circuit in typical telecommunications equipment has high signal receiving sensitivity of 10 mV unlike a transistor but the current consumption of the comparator is at least ten times that of the transistor. Thus, it is difficult to keep the current consumption of the comparator in a battery mounted for a theft prevention tag over a long period of time, leading to difficulty in mounting the comparator for the theft prevention tag.

In this case, the comparator is a comparator including an integrated circuit, for example, NCX2200 or NCV2200 of ON Semiconductor or a comparator assembled into a microprocessor, for example, a comparator assembled into MSP430F1111A and so on of Texas Instruments, Inc.

In order to transmit a radio signal (trigger signal) at a proper signal level to a theft prevention tag that causes a receiving antenna to receive a radio signal with low sensitivity, a transmitting antenna needs to have a large size of 40 cm (width)*1 m (height). However, such a large antenna installed near a store entrance may spoil an aesthetic appearance, leading to degraded images of high-class stores and so on.

In a tuning high frequency receiving circuit for a theft prevention tag including an LC resonator, detection sensitivity depends on the performance of the resonator and the receiving circuit. Thus, the detection sensitivity may become too inefficient to meet the variety of security systems.

Moreover, transistors may have low power efficiency with large power consumption, requiring a structuring considering heat dissipation, leading to difficulty in downsizing.

The present invention has been devised to solve the problems. An object of the present invention is to provide a sound recognition theft prevention system that can reliably detect an abnormal state, in which a self-sounding theft prevention tag issues an alarm in the event of theft, in a remote location without being interrupted by electromagnetic noise.

Solution to Problem

In order to solve the problems, a sound recognition theft prevention system of the present invention includes: a self-sounding theft prevention tag that is attached to an object disposed in a theft warning region and issues a specific alarm when a theft occurs; a trigger signal transmission unit that transmits a trigger signal near an entrance of the theft warning region; and an alarm identification unit that identifies the alarm issued by the self-sounding theft prevention tag, the self-sounding theft prevention tag including an alarm issuing unit capable of issuing a first alarm and a second alarm as the specific alarm; an anomaly detection switch unit that opens or closes an electric circuit in response to a theft; a trigger signal reception unit that detects the trigger signal transmitted from the trigger signal transmission unit; and a tag control unit that causes the alarm issuing unit to issue the first alarm at activation of the anomaly detection switch unit and causes the alarm issuing unit to issue the second alarm when the trigger signal reception unit detects the trigger signal, wherein the alarm recognition unit recognizes at least one of the two alarms issued by the self-sounding theft prevention tag to determine occurrence of theft.

In the sound recognition theft prevention system of the present invention, the self-sounding theft prevention tag and the alarm identification unit are provided in each theft warning region, the alarm issuing unit of the self-sounding theft prevention tag issues the specific alarm with a different sound feature for each theft warning region, and the alarm identification unit only recognizes the specific alarm issued by the self-sounding theft prevention tag disposed in the corresponding theft warning region, to determine the occurrence of theft in the corresponding theft warning region when the specific alarm is recognized.

In the sound recognition theft prevention system of the present invention, the self-sounding theft prevention tag has a different tag identification code for each theft warning region, and the specific alarm issued by the alarm issuing unit has a different sound feature for each tag identification code.

In the sound recognition theft prevention system of the present invention, the self-sounding theft prevention tag has a tag-identification code storage part where the tag identification code is changeably stored, and the alarm issuing unit issues an alarm specific to the tag identification code according to the tag identification code stored in the tag-identification code storage part.

In the sound recognition theft prevention system of the present invention, the tag control unit includes a signal processing part that recognizes whether an input signal has been received from the anomaly detection switch unit or the trigger signal reception unit, and decides whether to issue the first alarm or the second alarm; and an alarm control part that outputs, to the alarm issuing unit in response to an instruction of the signal processing part, one of a first alarm drive signal for issuing the first alarm and a second alarm drive signal for issuing the second alarm.

In the sound recognition theft prevention system of the present invention, the alarm identification unit includes a first alarm identification device that recognizes the first alarm issued by the self-sounding theft prevention tag to determine occurrence of theft in the theft warning region.

In the sound recognition theft prevention system of the present invention, the alarm identification unit includes a second alarm identification device that recognizes the second alarm issued by the self-sounding theft prevention tag to determine occurrence of theft near the entrance of the theft warning region.

In the sound recognition theft prevention system of the present invention, the alarm identification unit includes a first alarm identification device that recognizes the first alarm issued by the self-sounding theft prevention tag to determine occurrence of theft in the theft warning region, and a second alarm identification device that recognizes the second alarm issued by the self-sounding theft prevention tag to determine occurrence of theft near the entrance of the theft warning region.

In the sound recognition theft prevention system of the present invention, the alarm identification unit includes a microphone that receives an alarm issued by the self-sounding theft prevention tag, and a sound duct that guides an alarm to the microphone, the sound duct having an effective length in a range of $1/4 \pm 1/12$ of a wavelength of an alarm.

In the sound recognition theft prevention system of the present invention, the trigger signal reception unit of the self-sounding theft prevention tag includes: a tag receiving antenna that receives the trigger signal; and a comparator that transmits, to the tag control unit, a signal indicating reception of the trigger signal by the tag receiving antenna, and the tag control unit includes a comparator power supply control part that controls power supplied to the comparator and intermittently operates the comparator.

In the sound recognition theft prevention system of the present invention, the tag control unit includes a sensitivity adjustment unit that changes a comparative threshold voltage to be inputted to the comparator and sets the sensitivity of the trigger signal reception unit of the self-sounding theft prevention tag.

In the sound recognition theft prevention system of the present invention, the trigger signal reception unit of the self-sounding theft prevention tag includes: a resonator where a resonator coil and a resonator capacitor are connected in parallel; a transistor whose base terminal is connected to the resonator; and a feedback coil connected to the emitter terminal of the transistor, and resonance of the resonator activates the transistor so as to perform positive feedback on the resonator by means of the feedback coil.

In the sound recognition theft prevention system of the present invention, the trigger signal reception unit of the self-sounding theft prevention tag includes a bias control circuit that controls a bias voltage supplied to the transistor.

In the sound recognition theft prevention system of the present invention, the trigger signal transmission unit includes: a resonant circuit that is composed of a coil and a capacitor; and a first gate driver for a power control MOS transistor, the first gate driver receiving a first drive signal and outputting a second drive signal for driving the resonant circuit, and at least one of the voltage and the current of an output signal from the first gate driver is higher than that of the first drive signal.

In the sound recognition theft prevention system of the present invention, the trigger signal transmission unit includes a second gate driver disposed on one end of the resonant circuit with the first gate driver connected to an opposite end, the second gate driver having a characteristic identical to that of the first gate driver in opposite phases.

In the sound recognition theft prevention system of the present invention, the trigger signal transmission unit includes a voltage comparator connected to the input terminal of the first gate driver, the first drive signal is inputted to one input terminal of the voltage comparator through a time-constant circuit including a resistor and a capacitor, a control voltage is inputted to the other input terminal of the voltage comparator, a duty ratio of the second drive signal is adjusted by controlling the control voltage, and the adjustment controls the output voltage of the first gate driver.

In the sound recognition theft prevention system of the present invention, the trigger signal transmission unit includes two voltage comparators connected to the input terminals of the first gate driver and the second gate driver, respectively, the first drive signal is inputted to one input terminal of each of the voltage comparators through a time-constant circuit including a resistor and a capacitor, a control voltage is inputted to the other input terminal, the duty ratio of the second drive signal is adjusted by controlling the control voltage, and the adjustment controls an output voltage.

In the sound recognition theft prevention system of the present invention, the trigger signal transmission unit includes an antenna wire that transmits, near the entrance of the theft warning region, the trigger signal to the theft prevention tag, the antenna wire being laid in a single turn in a floor near the entrance of the theft warning region.

In the sound recognition theft prevention system of the present invention, the trigger signal transmission unit includes an antenna wire that transmits, near the entrance of the theft warning region, the trigger signal to the theft prevention tag, the antenna wire being disposed in a facade sign near the entrance of the theft warning region.

The sound recognition theft prevention system of the present invention further includes a remote control that transmits a remote control signal for controlling the tag control unit of the self-sounding theft prevention tag, the remote control transmitting, as the remote control signal, a sensitivity control signal for instructing a change of a comparative threshold voltage to be inputted to the comparator of a sensitivity adjustment unit.

Advantageous Effects of Invention

As described above, according to the present invention, the self-sounding theft prevention tag issues alarms having different sound features for locations where thefts have occurred. Thus, in an abnormal condition where the self-sounding theft prevention tag issues an alarm to indicate the occurrence of theft, the first alarm is issued to indicate that a theft has occurred in the theft warning region, whereas second alarm indicates that a theft has occurred near the entrance of the theft warning region. This can increase the speed of an action of a guard after an alarm is issued.

The first alarm or the second alarm as an alarm issued by the self-sounding theft prevention tag is recognized by the alarm identification unit to detect the occurrence of theft. Thus, unlike in the detection of radio waves according to the related art, the occurrence of theft in the theft warning region can be reliably detected without being interrupted by electromagnetic noise generated from a lighting unit, an electrical apparatus, and a power supply line, and so on.

Since an alarm can be easily issued with a larger range as compared with electromagnetic noise of the related art, the alarm identification unit can reliably identify the first alarm and the second alarm with different sound features even in remote locations. This can eliminate the need for a large receiving antenna for receiving radio waves such as electromagnetic noise in the related art. Thus, only the small trigger signal transmission unit is provided in this configuration, reducing the size of the theft prevention system. This can reduce the number of second alarm identification devices installed near the entrances of stores, thereby suppressing factors that may spoil aesthetic appearances near the entrances of, for example, high-class stores.

The self-sounding theft prevention tag issues specific alarms as different sounds for respective theft warning regions. The alarm identification unit recognizes only a specific alarm issued by the self-sounding theft prevention tag disposed in the corresponding theft warning region, thereby reliably preventing a malfunction when the self-sounding theft prevention tag issues alarms in the other theft warning regions.

In a commercial facility including neighboring stores, a specific alarm issued by the alarm issuing unit has a different sound feature for each of the tag identification codes. Thus, the self-sounding theft prevention tags having different sound features are disposed with different tag identification codes at least in the neighboring stores, thereby preventing a malfunction even when the same theft prevention system is used in the neighboring stores.

Furthermore, in the case of a typical tag, the sound feature of a specific alarm cannot be confirmed unless the alarm is issued. By uniquely identifying the tag identification code and a specific alarm, the specific alarm can be identified only by confirming the tag identification code without issuing the self-sounding theft prevention tag.

Moreover, alarms specific to the tag identification codes stored in the tag-identification code storage part are issued by the alarm issuing unit according to the tag identification codes. Thus, the specific alarm can be easily changed by switching the tag identification codes.

The comparator is intermittently operated to reduce average current consumption and suppress power consumption. This allows the use of the comparator in the theft prevention tag and improves the receiving sensitivity of the trigger signal. Consequently, the transmitting antenna for transmitting the trigger signal can be downsized.

The feedback coil is provided to perform a feedback operation on the resonator coil constituting the resonator, thereby increasing the output of the resonance signal. This can efficiently increase the sensitivity of the tuning high-frequency receiving circuit.

Since the sensitivity of the self-sounding theft prevention tag can be increased, an open entrance can be realized with a single turn of the antenna wire installed in a floor or a facade sign.

DESCRIPTION OF EMBODIMENT

First Embodiment

Embodiments of the present invention will be described below in accordance with the accompanying drawings. In the present embodiment, the present invention is applied to a plurality of theft warning regions. The present invention is also applicable to a single theft warning region.

Figure 6:
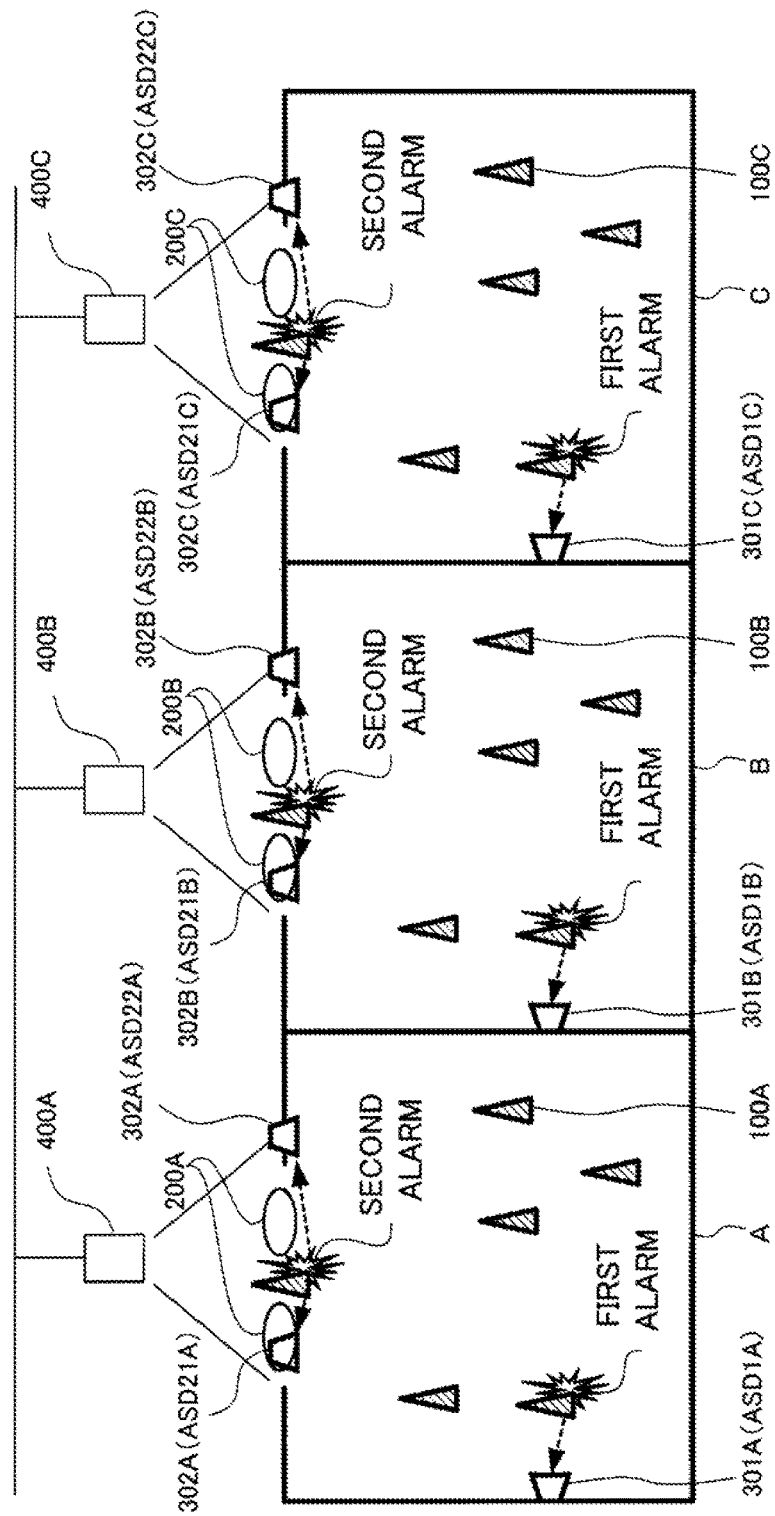
FIG. 6 is a schematic diagram showing a theft prevention system according to the first embodiment.

As shown in FIG. 6, a sound recognition theft prevention system of the present embodiment is implemented in, for example, a commercial facility where stores are adjacent to each other or are close to each other along a street. The stores are designated as independent theft warning regions A, B, and C, respectively.

The theft warning regions A, B, and C respectively include self-sounding theft prevention tags 100A, 100B, and 100C disposed on objects to be protected from theft, trigger signal transmission units 200A, 200B, and 20CC that transmit trigger signals near the entrances of the theft warning regions A, B, and C, first alarm identification devices 301A, 301B, and 301C that identify first alarms Am1A, Am1B, and Am1C issued by the self-sounding theft prevention tags 100A, 100B, and 100C, second alarm identification devices 302A, 302B, and 302C that are disposed near the entrances of the theft warning regions and identify second alarms Am2A, Am2B, and Am2C issued by the self-sounding theft prevention tags 100A, 100B, and 100C, and surveillance cameras 400A, 400B, and 4000 that operate in synchronization with the second alarm identification devices 302A, 302B, and 302C.

Figure 2:
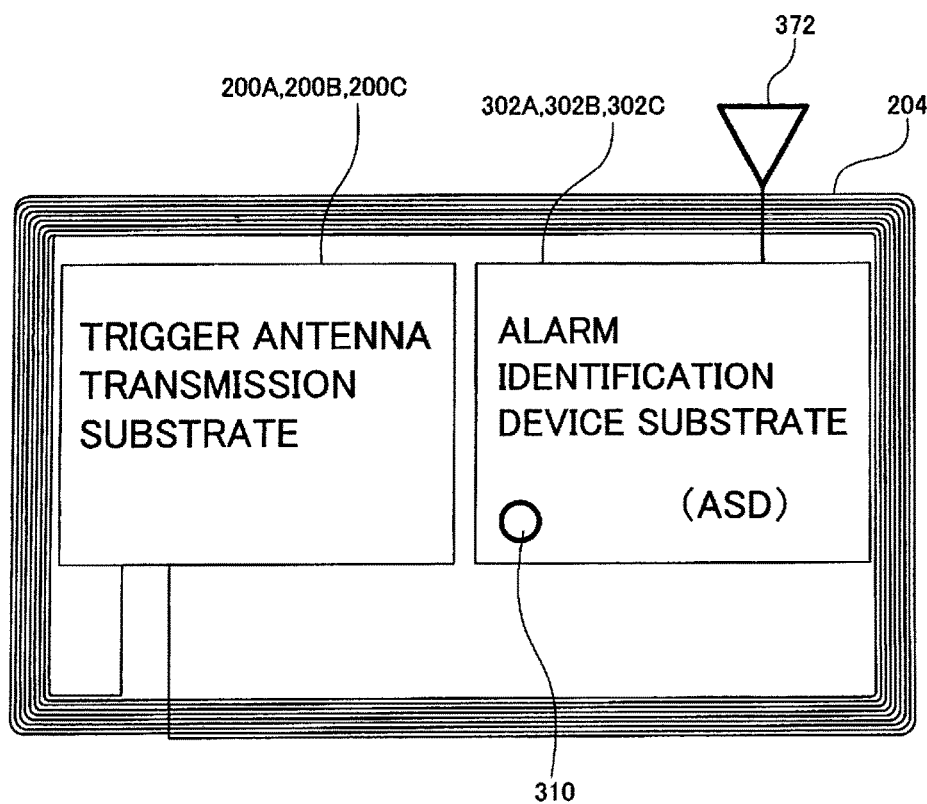
FIG. 2 is a schematic diagram showing the configuration of a combination of an alarm identification unit, a trigger signal transmission unit, and a transmitting antenna according to the first embodiment.
Figure 3:
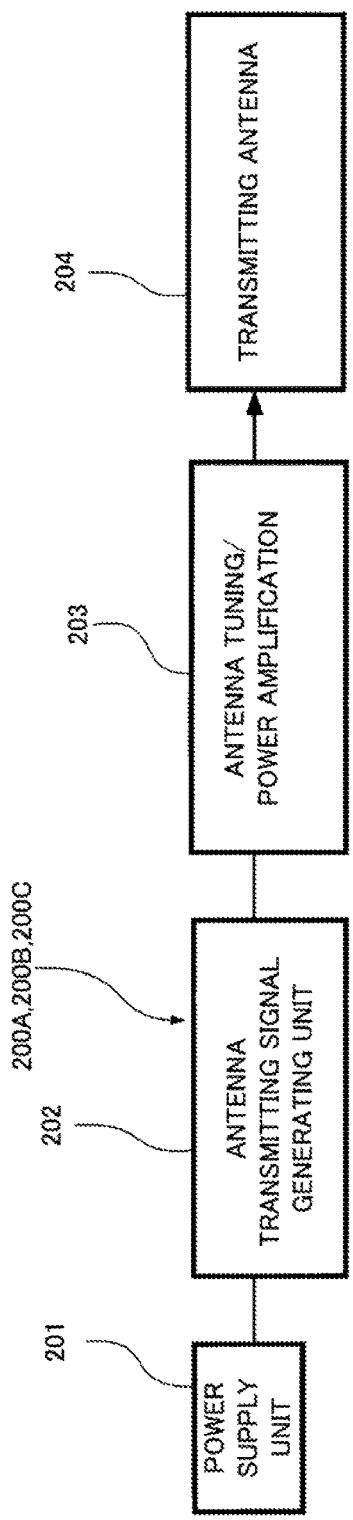
FIG. 3 is a block diagram showing a principal part of the trigger signal transmission unit.

As shown in FIG. 3, each of the trigger signal transmission units 200A, 200B, and 200C includes a power supply unit 201, an antenna transmitting signal generating unit 202, an antenna tuning/power amplification unit 203, and a transmitting antenna (aerial winding) 204. As shown in FIG. 2, the trigger signal transmission units 200A, 200B, and 200C and the second alarm identification devices 302A, 302B, and 302C may be combined. The trigger signals transmitted by the trigger signal transmission units 200A, 200B, and 200C may be shared by all the theft warning regions A, B, and C, may be signals specific to the theft warning regions A, B, and C, respectively, or may each include a tag identifying signal, which will be discussed later.

The first alarm identification devices 301A, 301B, and 301C detect the occurrence of theft in the theft warning regions A, B, and C by recognizing the first alarms Am1A, Am1B, and Am1C issued by the self-sounding theft prevention tags 100A, 100B, and 1000. The second alarm identification devices 302A, 302B, and 302C detect the occurrence of theft near the entrances of the theft warning regions A, B, and C by recognizing the second alarms Am2A, Am2B, and Am2C issued by the self-sounding theft prevention tags 100A, B, and C.

Each of the second alarm identification devices 302A, 302B, and 302C recognizes only specific alarm issued by the self-sounding theft prevention tags 100A, 100B, and 100C disposed in the respective theft warning regions A, B, and C. The surveillance cameras 400A, 400B, and 400C take photographs near the entrances of the respective theft warning regions A, B, and C when the alarm identifying units A, B, and C detect the second alarms Am2A, Am2B, and Am2C that indicate the occurrence of theft.

In FIG. 6, the first alarm identification devices 301A, 301B, and 301C are indicated by symbols ASD1A, ASD1B, and ASD1C. The second alarm identification devices 302A, 302B, and 302C combined with the trigger signal transmission units 200A, 2003, and 200C are indicated by symbols ASD21A, ASD21B, and ASD21C near the entrances of the theft warning regions A, B, and C. Moreover, the second alarm identification devices 302A, 302B, and 302C disposed separately from the trigger signal transmission units 200A, 2003, and 200C are indicated by symbols ASD22A, ASD22B, and ASD22C. Actually, the second alarm identification devices 302A, 302B, and 302C are indicated by symbols ASD21A, ASD21B, and ASD21C or symbols ASD22A, ASD22B, and ASD22C. For the sake of convenience, the two configurations are illustrated.

Figure 4:
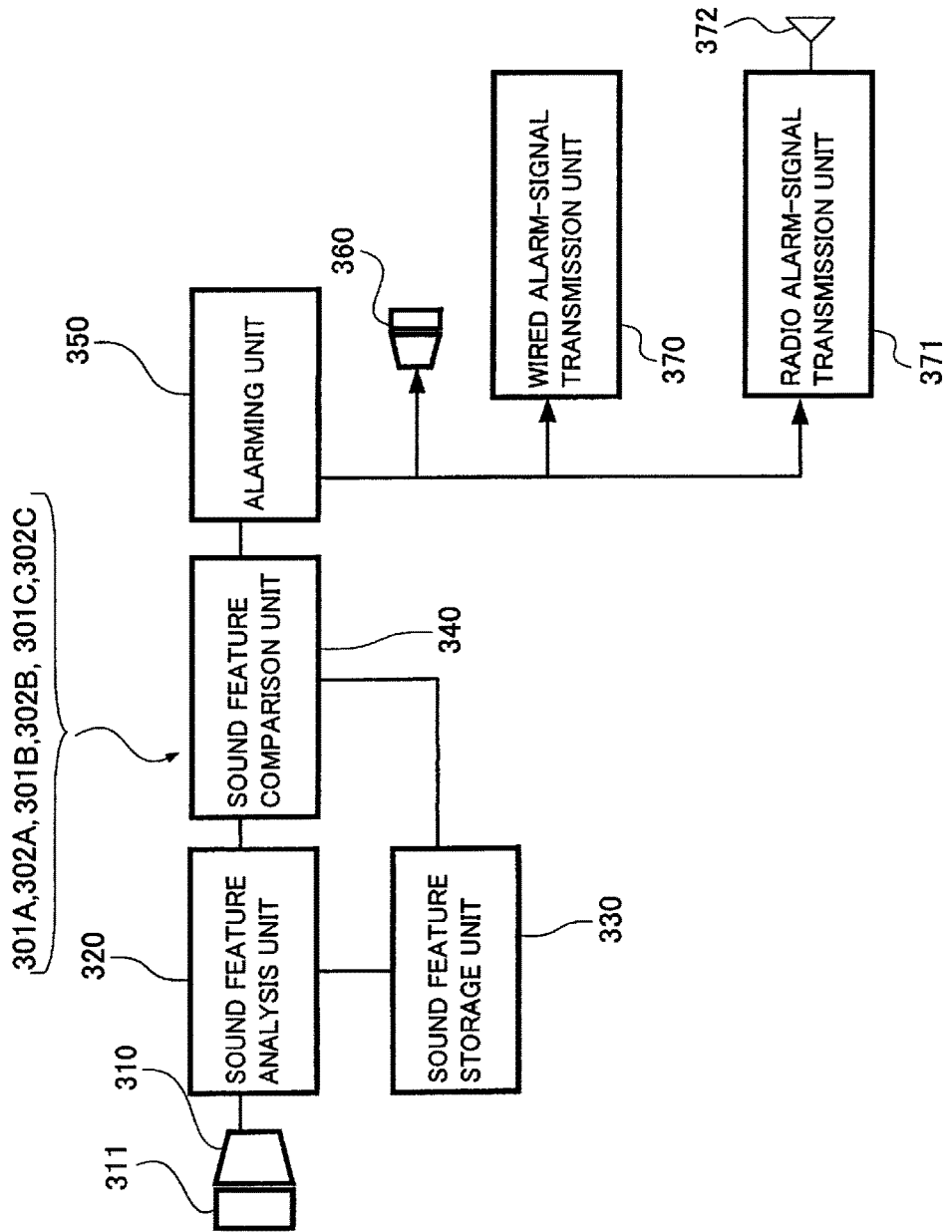
FIG. 4 is a block diagram showing a principal part of the alarm identification unit.

The first alarm identification devices 301A, 301B, and 301C and the second alarm identification devices 302A, 302B, and 302C are identical in configuration. As shown in FIG. 4, the alarm identification device includes a microphone 310, a sound feature analysis unit 320, a sound feature storage unit 330, a sound feature comparison unit 340, an alarming unit 350, an alarm buzzer 360, a wired alarm-signal transmission unit 370, and a radio alarm-signal transmission unit 371 (radio antenna 372). Only one of the wired alarm-signal transmission unit 370 and the radio alarm-signal transmission unit 371 may be provided.

The microphone 310 captures an alarm issued from the theft prevention tag 100 and so on. In this configuration, the microphone 310 has the function of amplifying a weak microphone signal and a filter function that mainly allows passage of the frequency components of an alarm. The microphone 310 has a sound duct 311 that guides the first alarms Am1A, Am1B, and Am1C or the second alarms Am2A, Am2B, Am2C to the microphone 310. The sound duct 311 desirably has an effective length substantially equal to a quarter of the wavelength of an alarm.

Figure 24:
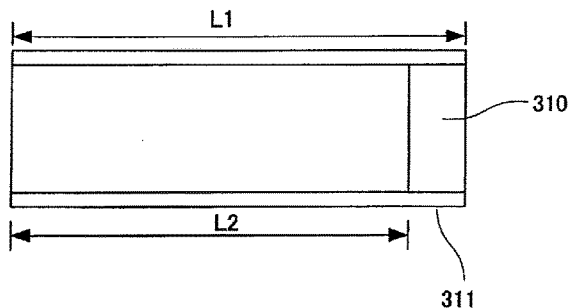
FIG. 24 shows the form of a sound duct.

For example, as shown in FIG. 24, the sound duct 311 is composed of a polyvinyl chloride pipe. The sound duct 311 has an effective length L2 that is determined by subtracting the length of the microphone 310 from an actual length L1. In the present embodiment, the effective length L2 is a quarter of a wavelength λ of the first alarms Am1A, Am1B, and Am1C or the second alarms Am2A, Am2B, and Am2C.

Figure 25:
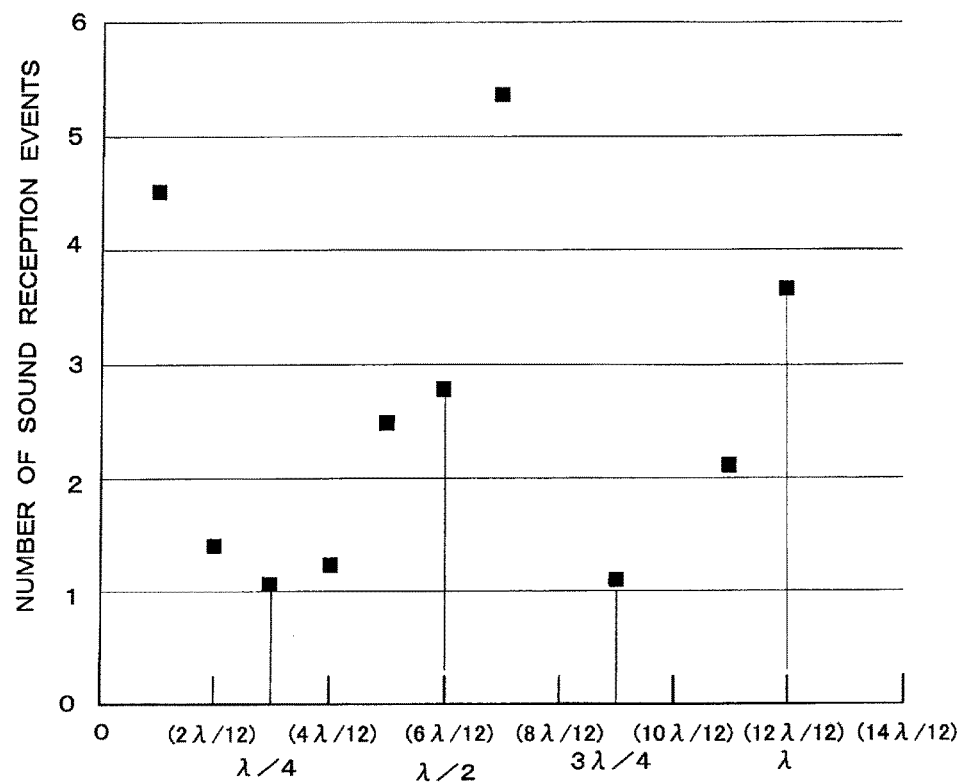
FIG. 25 is a graph showing the relationship between an effective length of the sound duct and the number of times of reception.

In FIG. 25, the horizontal axis indicates an effective length of the sound duct 311 while the vertical axis indicates the number of sound reception events required for recognizing an alarm. For example, 1 on the vertical axis indicates that an intermittent alarm is recognized by the first sound reception, and 2 on the vertical axis indicates that an intermittent alarm is recognized by the second sound reception. FIG. 25 indicates that the sound duct 311 has an effective length of λ/4±λ/12, facilitating recognition of an alarm.

The sound feature analysis unit 320 analyzes a sound captured from the microphone 310, that is, the sound feature of the captured sound. The sound feature analysis unit 320 analyzes a sound as follows: a sound captured from the microphone 310 is subjected to frequency analysis to determine the frequency component of a specific frequency included in the first alarms Am1A, Am1B, and Am1C or the second alarms Am2A, Am2B, and Am2C, for example, an amplitude component as an alarm frequency component W (t). On the time variant waveform of the alarm frequency component, a time variant waveform in a specific period is determined as a time variation pattern.

In the theft warning region A, the sound feature storage unit 330 of the first alarm identification device 301A stores a first alarm time variation pattern that is the sound feature of the first alarm Am1A and the sound feature storage unit 330 of the second alarm identification device 302A stores a second alarm time variation pattern that is the sound feature of the second alarm Am2A.

In the theft warning region B, the sound feature storage unit 330 of the first alarm identification device 301B stores a first alarm time variation pattern that is the sound feature of the first alarm Am1B and the sound feature storage unit 330 of the second alarm identification device 302B stores a second alarm time variation pattern that is the sound feature of the second alarm Am2B.

In the theft warning region C, the sound feature storage unit 330 of the first alarm identification device 301C stores a first alarm time variation pattern that is the sound feature of the first alarm Am1C and the sound feature storage unit 330 of the second alarm identification device 302C stores a second alarm time variation pattern that is the sound feature of the second alarm Am2C.

The first alarm identification devices 301A, 301B, and 301C each compare the sound feature of a sound analyzed by the sound feature analysis unit 320, that is, a time variation pattern, which serves as the sound feature of a sound captured through the microphone 310, with the first alarm time variation patterns stored as the sound features of the first alarms Am1A, Am1B, and Am1C in the respective sound feature storage units 330. If there is a match, the alarm identification device decides that a captured sound is identical to a registered (stored) alarm and then notifies the alarming unit 350 of the comparison result.

The second alarm identification device 302A (302B, 301C) compares the sound feature of a sound analyzed by the sound feature analysis unit 320, that is, a time variation pattern, which serves as the sound feature of a sound captured through the microphone 310, with the second alarm time variation pattern stored as the sound feature of the second alarm Am2A (Am2B, Am2C) in the sound feature storage unit 330. If there is a match, the alarm identification device decides that a captured sound is identical to a registered (stored) alarm and then notifies the alarming unit 350 of the comparison result. The second alarm identification device 302A (302B, 301C) notifies the alarming unit 350 of the comparison result and operates the surveillance camera 400A (400B, 400C) to photograph the entrance of the theft warning region A (B, C).

Figure 5:
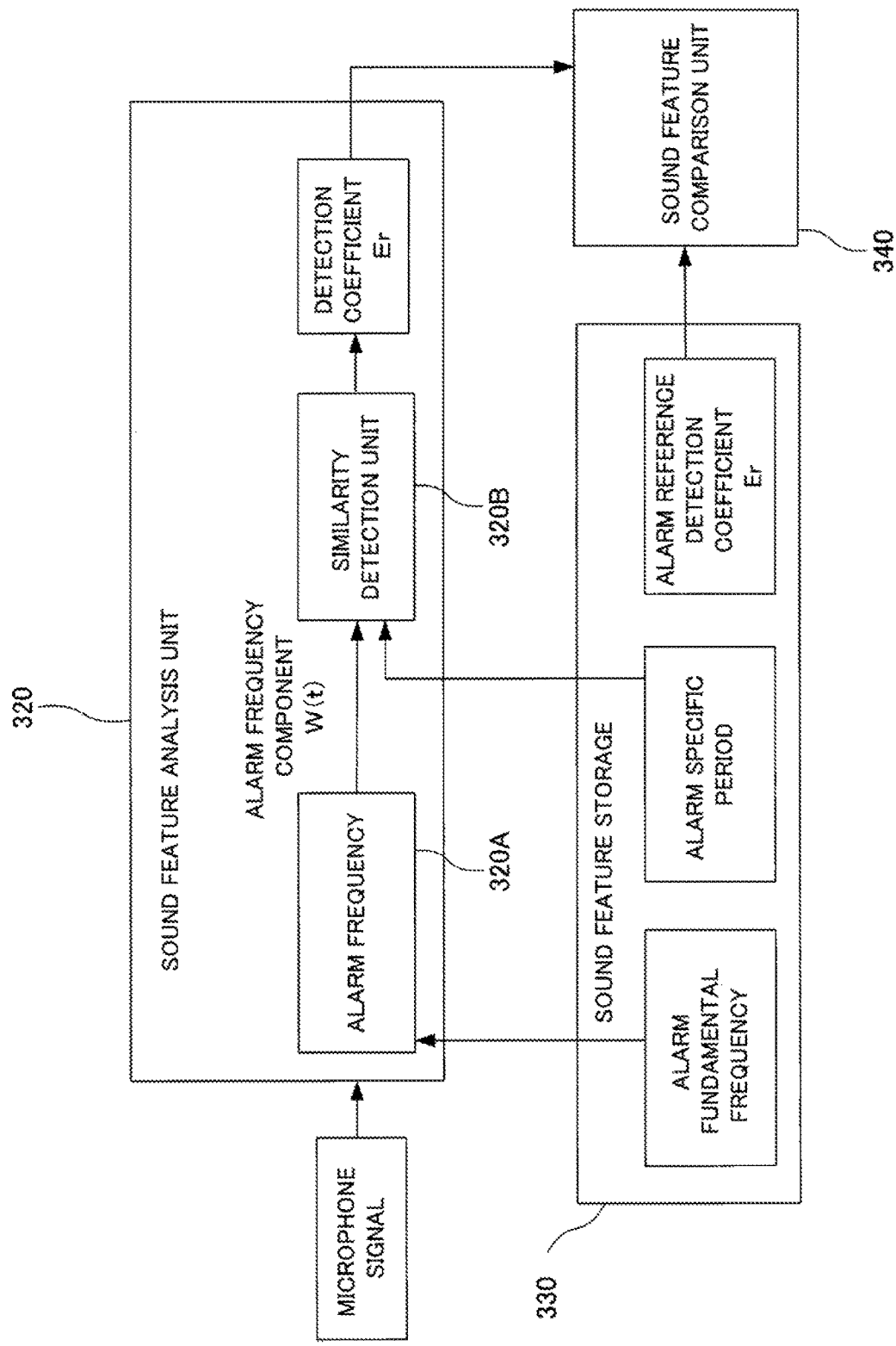
FIG. 5 is a schematic diagram showing the configuration of a sound feature analysis unit according to the first embodiment.

The sound feature analysis unit 320 and the sound feature storage unit 330 can be configured as shown in FIG. 5. The sound feature analysis unit 320 includes an alarm frequency analysis unit 320A and a similarity detection unit 320B. The alarm frequency analysis unit 320A performs frequency analysis on a sound to be analyzed, the sound being captured from the microphone 310. Moreover, the frequency component of a specific frequency included in a sound to be analyzed is determined as an alarm frequency component W (t). The frequency component is the frequency component of a specific frequency of the first alarms Am1A, Am1B, and Am1C or the second alarms Am2A, Am2B, and Am2C, for example, an amplitude component.

The similarity detection unit 320B captures the time variant waveform of the alarm frequency component W (t) indicated on the output waveform of the alarm frequency analysis unit 320A and determines, as a time variation pattern, the time variant waveform of the alarm frequency component W (t) in a specific period of the time variant waveform. Subsequently, the similarity detection unit 320B calculates autocorrelation between the time variation pattern in the specific period and a time variation pattern in a period preceding the specific period, and the similarity detection unit 320B then calculates a detection coefficient Er serving as a similarity evaluation index of a sound to be analyzed.

The sound feature storage unit 330 stores the alarm fundamental frequency of a target sound, the alarm specific period of the target sound, and a reference detection coefficient ER of the target sound. The alarm fundamental frequency of the target sound is the frequency of the first alarm Am1A (Am1B, Am1C) or the second alarm Am2A (Am2B, Am2C). The alarm fundamental frequency is used as a specific frequency in the analysis of the alarm frequency analysis unit 320A.

The alarm specific period of a target sound is the period of the first alarm Am1A (Am1B, Am1C) or the second alarm Am2A (Am2B, Am2C). The alarm specific period is used as a specific period in the similarity detection of the similarity detection unit 320E.

The alarm reference detection coefficient ER of a target sound is a similarity evaluation index that is obtained by determining the alarm frequency component W (t) of the first alarm Am1A (Am1B, Am1C) or the second alarm Am2A (Am2B, Am2C) according to a technique for the alarm frequency analysis unit 320A and determining autocorrelation according to a technique for the similarity detection unit 320B.

The sound feature comparison unit 340 compares the detection coefficient Er that is the similarity evaluation index of an analyzed sound obtained by the sound feature analysis unit 320 and the alarm reference detection coefficient ER of a target sound stored in the sound feature storage unit 330, and then the sound feature comparison unit 340 detects whether a sound captured from the microphone 310 includes an alarm or not according to the degree of matching.

The alarming unit 350 drives the alarm buzzer 360 in response to a notification from the sound feature comparison unit 340 so as to additionally issue a loud alarm having a different sound feature from the first alarm or the second alarm, and then the alarming unit 350 distributes information to a security system in a security guard room through the wired alarm-signal transmission unit 370 or the radio alarm-signal transmission unit 371 (radio antenna 372) via radio or wire communications.

An alarm will be discussed below. The self sounding theft prevention tags 100A, 100B, and 100C have different tag identification codes IDA, IDB, and IDC for the respective theft warning regions A, B, and C. Specific alarms are set with different sound features associated with the respective tag identification codes IDA, IDB, and IDC.

Specifically, the self-sounding theft prevention 100A issues one of the first alarm Am1A and the second alarm Am2A that are associated with the tag identification code IDA, the self-sounding theft prevention 100B issues one of the first alarm Am1B and the second alarm Am2B that are associated with the tag identification code IDB, and the self-sounding theft prevention 100O issues one of the first alarm Am1C and the second alarm Am2C that are associated with the tag identification code IDC.

In the present embodiment, multiple stores are described as the independent theft warning regions A, B, and C. The present invention can be used with different tag identification codes set for the respective sections of a store, for example, a toy section and a PC section. Moreover, the tag identification codes IDA, IDB, and IDC can be also used as identification information on stores or sections for a reset signal, which will be discussed later.

In the present embodiment, an alarm is intermittently issued at several kHz several times per second. Alternatively, the intermittently issued alarm may be sweeping sound ranging from, for example, 2 kHz to 4 kHz.

The alarm is issued as a specific alarm for the tag identification code by an alarm issuing unit, which will be discussed later, according to the tag identification code stored in a tag identification code storage unit.

Figure 7:
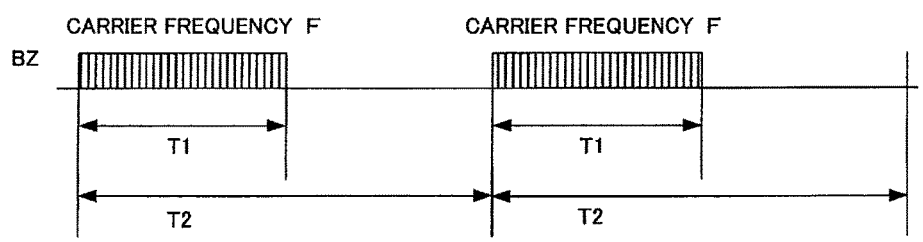
FIG. 7 is a schematic diagram showing the configuration of a first alarm and a second alarm according to the first embodiment.

Specifically, as shown in FIG. 7, the first alarms Am1A, Am1B, and Am1C and the second alarms Am2A, Am2B, and Am2C are defined by equations shown below, in which F is a carrier frequency. T1 is a sounding period. T2 is a sounding interval, and IDA, IDB, and IDC are tag identification codes. In this case, values of 0, 1, and 2 are allocated to the three tag identification codes IDA, IDB, and IDC, respectively, and the carrier frequency F has a frequency amplification rate of 50 Hz, and the sounding time T1 has an amplification time of 5 ms. The number of tag identification codes is not limited and is actually determined according to the width of a store and the range of an alarm. The identification function can be sufficiently obtained by about eight tag identification codes.

First Alarm Am1A $F=F(IDA)=3.1\ kHz+50\ Hz\times 0=3.1\ kHz$ $T1=T1(IDA)=70\ ms+5\ ms\times 0=70\ ms$ $T2=T2(IDA)=180\ ms+5\ ms\times 0=180\ ms$ Specifically, the first alarm Am1A has a sound feature such that a sound at a frequency of 3.1 kHz continues for 70 ms, stops for 110 ms, and then is intermittently emitted at intervals of 180 ms.

First Alarm Am1B $F=F(IDB)=3.1\ kHz+50\ Hz\times 1=3.15\ kHz$ $T1=T1(IDB)=70\ ms+5\ ms\times 1=75\ ms$ $T2=T2(IDB)=180\ ms+5\ ms\times 1=185\ ms$ Specifically, the first alarm Am1B has a sound feature such that a sound at a frequency of 3.15 kHz continues for 75 ms, stops for 110 ms, and then is intermittently emitted at intervals of 185 ms.

First Alarm Am1C $F=F(IDC)=3.1\ kHz+58\ Hz\times 2=3.2\ kHz$ $T1=T1(IDC)-70\ ms+5\ ms\times 2=80\ ms$ $T2-T2(IDC)=180\ ms+5\ ms\times 2=190\ ms$ Specifically, the first alarm Am1C has a sound feature such that a sound at a frequency of 3.2 kHz continues for 80 ms, stops for 110 ms, and then is intermittently emitted at intervals of 190 ms.

Second Alarm Am2A $F=F(IDA)=3.6\ kHz+50\ Hz\times 0=3.6\ kHz$ $T1=T1(IDA)=50\ ms+5\ ms\times 0=50\ ms$ $T2=T2(IDA)=150\ ms+5\ ms\times 0=150\ ms$ Specifically, the second alarm Am2A has a sound feature such that a sound at a frequency of 3.6 kHz continues for 50 ms, stops for 100 ms, and then is intermittently emitted at intervals of 150 ms.

Second Alarm Am2B $F=F(IDB)=3.6\ kHz+50\ Hz\times 1=3.65\ kHz$ $T1=T1(IDB)=50\ ms+5\ ms\times 1=55\ ms$ $T2=T2(IDB)=150\ ms+5\ ms\times 1=155\ ms$ Specifically, the second alarm Am2B has a sound feature such that a sound at a frequency of 3.65 kHz continues for 55 ms, stops for 100 ms, and then is intermittently emitted at intervals of 155 ms.

Second Alarm Am2C $F=F(IDC)=3.6\ kHz+50\ Hz\times 2=3.7\ kHz$ $T1=T1(IDC)=50\ ms+5\ ms\times 2=60\ ms$ $T2=T2(IDC)=150\ ms+5\ ms\times 2=160\ ms$ Specifically, the second alarm Am2C has a sound feature such that a sound at a frequency of 3.7 kHz continues for 60 ms, stops for 100 ms, and then is intermittently emitted at intervals of 160 ms.

In the present embodiment, the self-sounding theft prevention tag 100 issues two sounds having two different sound features as specific alarms. Two or more sounds may be issued with different sound features.

As described above, the first alarms Am1A, Am1B, and Am1C and the second alarms Am2A, Am2B, and Am2C, which are specific alarms issued by the self-sounding theft prevention tags 100A, 100B, and 100C, are different sounds for the respective theft warning regions A, B, and C, and the alarm identification units 301A, 301B, 301C, 3021, 302B, and 302C only identify specific alarms issued by the self-sounding theft prevention tags 100A, 100B, and 100C disposed in the respective theft warning regions A, B, and C. This can reliably prevent alarms issued by the self-sounding theft prevention tags 100A, 100B, and 100C in the other theft warning regions A, B, and C from causing a malfunction.

In a commercial facility including neighboring stores, a specific alarm issued by the alarm issuing unit has a different sound feature for each of the tag identification codes. Thus, the self-sounding theft prevention tags 100A, 100B, and 100C having different sound features are disposed with different tag identification codes at least in the neighboring stores, thereby preventing a malfunction even when the same theft prevention system is used in the neighboring stores.

Furthermore, in the case of a typical tag, the sound feature of a specific alarm cannot be confirmed unless the alarm is issued. By uniquely identifying the relationship between the tag identification codes IDA, IDB, and IDC and the first alarms Am1A, Am1B, and Am1C and the second alarms Am2A, Am2B, and Am2C, the specific alarm can be identified only by confirming the tag identification codes IDA, IDB, and IDC without issuing the self-sounding theft prevention tags 100A, 100B, and 100C.

Moreover, alarms specific to the tag identification codes IDA, IDB, and IDC stored in a tag-identification code storage part 151 are issued by an alarm issuing unit 110, which will be discussed later, according to the tag identification codes IDA, IDB, and IDC. Thus, the specific alarm can be easily changed by switching the identification codes IDA, IDB, and IDC.

Figure 1:
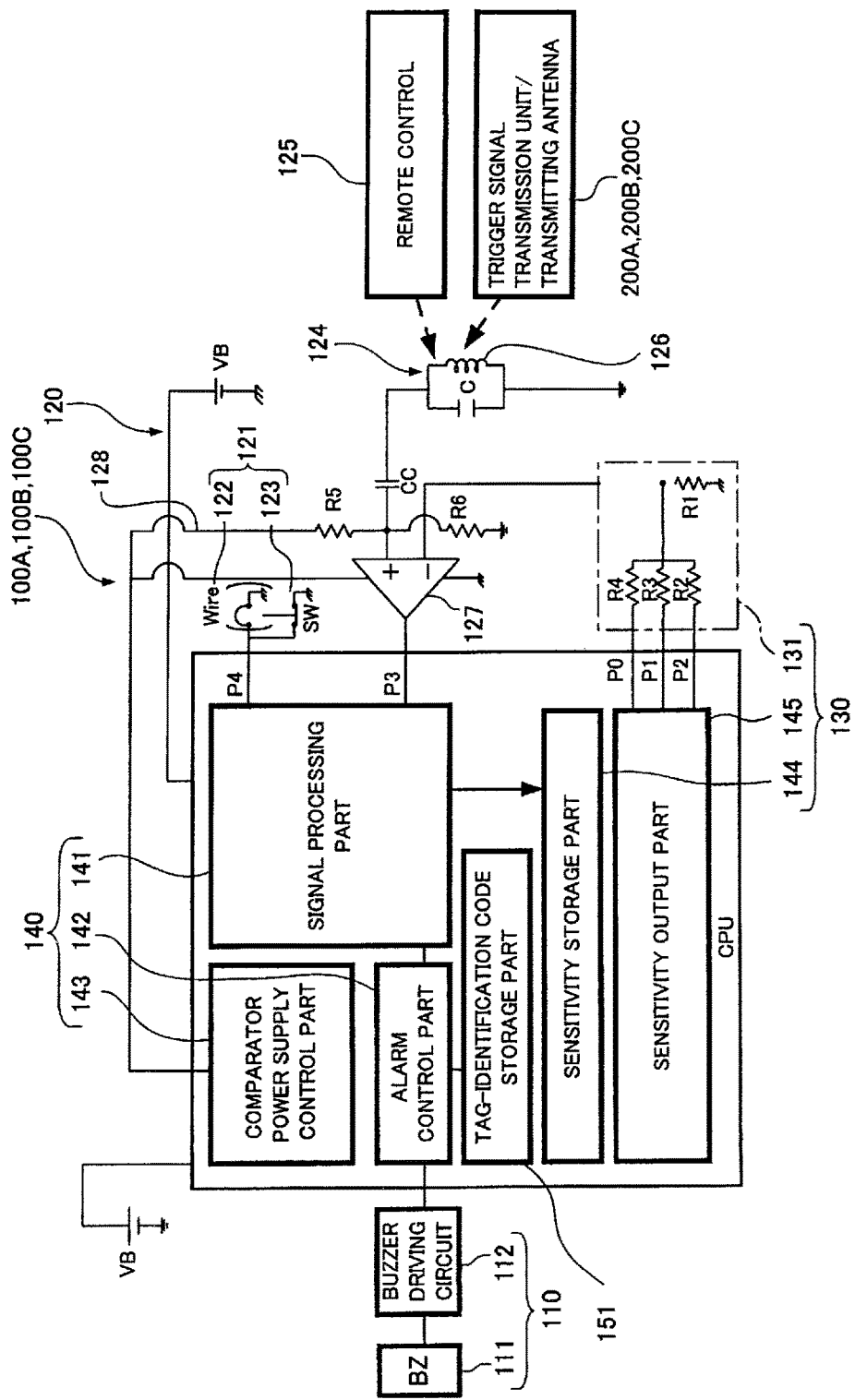
FIG. 1 is a block diagram showing the configuration of a theft prevention tag according to a first embodiment of the present invention.

As shown in FIG. 1, the self-sounding theft prevention tags 100A, 100B, and 100C each include the alarm issuing unit 110, a theft detection unit 120, a sensitivity adjustment unit 130, a tag control unit 140, and a battery VB. The alarm issuing unit 110 includes a buzzer 111 that can issue the first alarms Am1A, Am1B, and Am1C and the second alarms Am2A, Am2B, and Am2C as alarms and a buzzer driving circuit 112 that drives the buzzer 111. The theft detection unit 120 includes an anomaly detection switch unit 121 that opens or closes an electric circuit in response to a theft.

In FIG. 1, for the sake of convenience, two configurations are shown at the same time as the anomaly detection switch unit 121. Fundamentally, one of the configurations is used. The configuration include a wire switch 122 extended over the self-sounding theft prevention tags 100A, 100B, and 100C and an object. If the wire switch 122 is cut or drawn by a theft, the circuit closed in a normal state is opened to transmit a signal indicating an anomaly. The other configuration is a press switch 123 that closes the circuit in a normal state where the self-sounding theft prevention tags 100A, 100B, and 100C are attached to the object, and opens the circuit in an abnormal state where the self-sounding theft prevention tags 100A, 100B, and 100C are removed from the object, and the signal indicating an anomaly is transmitted.

The theft detection unit 120 includes a trigger signal reception unit 124 that detects the trigger signal transmitted from the trigger signal transmission units 200A, 200B, and 200C. The trigger signal reception unit 124 includes a tag receiving antenna (resonant circuit) 125 that receives a remote control signal transmitted from a remote control 125 operated by a manager or the trigger signal transmitted from the trigger signal transmission units 200A, 200B, and 200C, and a comparator 127 that transmits a signal indicating the reception of the trigger signal by the tag receiving antenna 126.

The remote control 125 transmits, to the self-sounding theft prevention tags 100A, 100B, and 100C, a set signal that places the self-sounding theft prevention tags 100A, 100B, and 100C in a warning state and a reset signal that stops an issued alarm. The reset signal including the tag identification code can also improve security.

The sensitivity adjustment unit 130 changes a comparison threshold voltage (threshold voltage) to be inputted to the comparator 127 and sets the sensitivity of the theft detection unit 120. The sensitivity adjustment unit 130 includes a sensitivity setting part 131, a sensitivity storage part 144, and a sensitivity output part 145, which will be discussed later. The sensitivity setting part 131 has a plurality of resistors R4, R3, and R2 having different resistance values. The outputs of output ports P0, P1, and P2 constituting the tag control unit 140 are combined so as to set the comparison threshold voltage (threshold voltage) of the comparator 127.

Example 1 High Sensitivity

If the output port P0 has a logic output Lo and the output ports P1 and P2 have a logic output Hi, a minimum comparison threshold voltage (threshold voltage) is inputted to the comparator 127 through the resistors R3 (2M) and R2 (4M) and increases the sensitivity of the comparator 127, allowing the theft detection unit 120 to have high sensitivity.

Example 2 Medium Sensitivity

If the output port P0 has the logic output Hi and the output ports P1 and P2 have the logic output Lo, a medium comparison threshold voltage (threshold voltage) is inputted to the comparator 127 through the resistor R4 (33$k$), so that the comparator 127 has medium sensitivity. This allows the theft detection unit 120 to have medium sensitivity.

Example 3 Low Sensitivity

If the output ports P0, P1, and P2 have the logic output Hi, a maximum comparison threshold voltage (threshold voltage) is inputted to the comparator 127 through the resistors R4 (33$k$), R3 (2M), and R2 (4M) and reduces the sensitivity of the comparator 127, allowing the theft detection unit 120 to have low sensitivity.

The tag control unit 140 controls the alarm issuing unit 110, issues the first alarm at the activation of the anomaly detection switch unit 121, and then issues the second alarm when the trigger signal reception unit 127 detects the trigger signal. The tag control unit 140 includes a signal processing part 141, an alarm control part 142, a comparator power supply control part 143, the sensitivity storage part 144, and the sensitivity output part 145.

The signal processing part 141 recognizes whether an input signal is received from the anomaly detection switch unit 121 or the trigger signal reception unit 124 of the theft detection unit 120 and decides whether to issue the first alarm or the second alarm.

In response to an instruction of the signal processing part 141, the alarm control part 142 outputs, to the buzzer driving circuit 112, a specific alarm drive signal for issuing an alarm specific to the tag identification code according to the tag identification code stored in the tag-identification code storage part 151. In this case, one of a first alarm drive signal for issuing the first alarm and a second alarm drive signal for issuing the second alarm is issued to the buzzer driving circuit 112. In the self-sounding theft prevention tags 100A, 100B, and 100C, the different tag identification codes for the respective theft warning regions A, B, and C are changeably stored in the tag-identification code storage part 151. According to the tag identification code stored in the tag-identification code storage part 151, a specific alarm is issued to the tag identification code, thereby easily changing the specific alarm by changing the tag identification code. Moreover, the specific alarm can be recognized by confirming the tag identification code without issuing the self-sounding theft prevention tags 100A, 100B, and 100C.

The comparator power supply control part 143 inputs power to the comparator 127 and applies a bias voltage to the comparator 127 through a bias circuit 128. The comparator power supply control part 143 performs on-off controls en power supply to the comparator 127 so as to suppress the current consumption of the self-sounding theft prevention tag 100.

The sensitivity storage part 144 stores a state of sensitivity instructed by the signal processing part 141 and instructs the sensitivity output part 145 on a combination of the output Ports P0, P1, and P2. The sensitivity output part 145 controls the logic output Hi/Lo of the output ports P0, P1, and P2 and controls the combination of the output ports P0, P1, and P2.

The effects of the configuration will be described below. The theft warning region A will be discussed as an example. The same effects are obtained also in the other theft warning regions B and C.

If the theft prevention tag 100A (100B, 100C) is removed from a product by theft, the anomaly detection switch unit 121 of the theft detection unit 120 is activated and a signal indicating an anomaly is transmitted to the signal processing part 141.

Alternatively, if a product with the theft prevention tag 100A (100B, 100C) is brought out of a store by theft, the theft detection unit 120 receives, through the tag receiving antenna (resonant circuit) 126 of the trigger signal reception unit 124, the trigger signal transmitted from the transmitting antenna 204 of the trigger signal transmission unit 200A (200B, 200C) disposed near the entrance. The comparator 127 transmits the reception of the trigger signal through the tag receiving antenna 126, to the signal processing part 141.

The signal processing part 141 recognizes whether an input signal has been received from the anomaly detection switch unit 121 or the trigger signal reception unit 124 of the theft detection unit 120 and decides whether the first alarm or the second alarm has been issued.

In response to an instruction of the signal processing part 141, the alarm control part 142 outputs, to the buzzer driving circuit 112, the first alarm drive signal for issuing the first alarm Am1A (Am1B, Am1C) to the alarm issuing part or the second alarm drive signal for issuing the second alarm Am2A (Am2B, Am2C). The buzzer 111 issues the first alarm Am1A (Am1B, Am1C) or the second alarm Am2A (Am2B, Am2C) to inform persons near the buzzer 111 of the occurrence of theft.

As described above, the self-sounding theft prevention tag 100A (100B, 100C) issues the first alarm Am1A (Am1B, Am1C) and the second alarm Am2A (Am2B, Am2C) having different sound features as alarms. Thus, when the first alarm Am1A (Am1B, Am1C) is issued, it can be decided that a theft occurs in the theft warning region A (B, C), whereas when the second alarm Am2A (Am2B, Am2C) is issued, it can be decided that a theft occurs near the entrance of the theft warning region A (B, C). This can increase the speed of an action of a guard after an alarm is issued.

The first alarm identification device 301A (301B, 301C) recognizes the first alarm Am1A (Am1B, Am1C) when the self-sounding theft prevention tag 100A (100B, 100C) issues the first alarm Am1A (Am1B, Am1C).

Specifically, in the first alarm identification device 301A (301B, 301C), the feature of a sound captured from the microphone 310 is analyzed by the sound feature analysis unit 320 and the sound feature comparison unit 340 compares the sound feature of the first alarm Am1A (Am1B, Am1C) stored in the sound feature storage unit 330 and the sound feature of the captured sound. If the sound features are identical to each other, it is decided that the captured sound is the first alarm Am1A (Am1B, Am1C).

Subsequently, the alarm buzzer 360 of the alarming unit 350 issues an alarm that is different from the first alarm Am1A (Am1B, Am1C), the second alarm Am2A (Am2B, Am2C), and the alarm of the second alarm identification device 302A (302B, 302C). Alternatively, the wired alarm-signal transmission unit 370 activates another warning device via wire communications or the radio alarm-signal transmission unit 371 (radio antenna 372) activates another warning device in response to a radio signal, informing a manager on the occurrence of theft in the theft warning region A (B, C).

The second alarm identification device 302A (302B, 302C) recognizes the second alarm Am2A (Am2B, Am2C) when the self-sounding theft prevention tag 100 (100B, 100C) issues the second alarm Am2A (Am2B, Am2C).

Specifically, in the second alarm identification device 302A (302B, 302C), the feature of a sound captured from the microphone 310 is analyzed by the sound feature analysis unit 320 and the sound feature comparison unit 340 compares the sound feature of the second alarm Am2A (Am2B, Am2C) stored in the sound feature storage unit 330 and the sound feature of the captured sound. If the sound features are identical to each other, it is decided that the captured sound is the second alarm Am2A (Am2B, Am2C).

Subsequently, the alarm buzzer 360 of the alarming unit 350 issues an alarm that is different from the first alarm Am1A (Am1B, Am1C), the second alarm Am2A (Am2B, Am2C), and the alarm of the first alarm identification device 301A (301B, 301C) and operates the surveillance camera 400A (400B, 400C) to photograph the entrance of the theft warning region A (B, C). Alternatively, the wired alarm-signal transmission unit 370 activates another warning device via wire communications or the radio alarm-signal transmission unit 371 (radio antenna 372) activates another warning device in response to a radio signal, informing a manager on the occurrence of theft near the entrance of the theft warning region A.

As described above, in the present embodiment, the first alarms Am1A, Am1B, and Am1C and the second alarms Am2A, Am2B, and Am2C have different sound features. This can locate the occurrence of theft in response to the alarm issued by the self-sounding theft prevention tag 100, thereby increasing the speed of an action of a guard after the alarm is issued.

Moreover, the first alarms Am1A, Am1B, and Am1C and the second alarms Am2A, Am2B, and Am2C that are issued by the self-sounding theft prevention tags 100A, 100B, and 100C are sounds varying among the theft warning regions A, B, and C, and the first alarm identification devices 301A, 301B, and 301C and the second alarm identification devices 302A, 302B, and 301C only recognize the first alarms Am1A, Am1B, and Am1C or the second alarms Am2A, Am2B, and Am2C that are issued by the self-sounding theft prevention tags 100A, 100B, and 100C disposed in the respective theft warning regions A, B, and C. This can reliably prevent a malfunction when the alarms are issued by the self-sounding theft prevention tags 100A, 100B, and 100C in the other theft warning regions A, B, and C.

Thus, in a commercial facility including neighboring stores, the self-sounding theft prevention tags 100A, 100B, and 100C having different sound features are disposed with different tag identification codes at least in the neighboring stores, thereby preventing a malfunction even when the same theft prevention system is used in the neighboring stores.

The first alarms Am1A, Am1B, and Am1C or the second alarms Am2A, Am2B, and Am2C, which are alarms issued by the self-sounding theft prevention tags 100A, 100B, and 100C, are detected by the first alarm identification devices 301A, 301B, and 301C or the second alarm identification devices 302A, 302B, and 302C to detect the occurrence of theft. Thus, unlike the detection of radio waves according to the related art, the occurrence of theft in the theft warning region A (B, C) can be reliably detected without being interrupted by electromagnetic noise generated from, for example, luminaires, electrical apparatuses, and power supply lines.

The typical theft prevention antenna according to Patent Literature 1 needs to receive electromagnetic noise with small electromagnetic energy when an alarm is issued from a tag. Thus, the receiving antenna typically needs to have a large size of about 30 cm*150 cm.

In the present embodiment, the sound features of alarms issued by the self-sounding theft prevention tags 100A, 100B, and 100C are identified. This eliminates the need for a large receiving antenna for receiving electromagnetic noise according to the related art and only requires small theft prevention antennas as the transmitting antennas 204 of the trigger signal transmission units 200A, 200B, and 200C. Even when the second alarm identification devices 302A, 302B, and 302C and the trigger signal transmission units 200A, 200B, and 200C are combined, the second alarm identification devices 302A, 302B, and 302C, in which receiving antennas are not necessary, can be reduced in size and thus the transmitting antenna 204 can be downsized to about 30 cm*50 cm.

According to the present embodiment, the transmitting antennas 204 included in the trigger signal transmission units 200A, 200B, and 200C are half or less the size of transmit/receive antenna for preventing theft according to the related art. Furthermore, the present embodiment can reduce the number of trigger signal transmission units 200 and the number of alarm identification devices 302 that are installed near the entrances of stores. This can considerably reduce the cost of the system and reduce factors that may spoil aesthetic appearances near the entrances of, for example, high-class stores.

Figure 9:
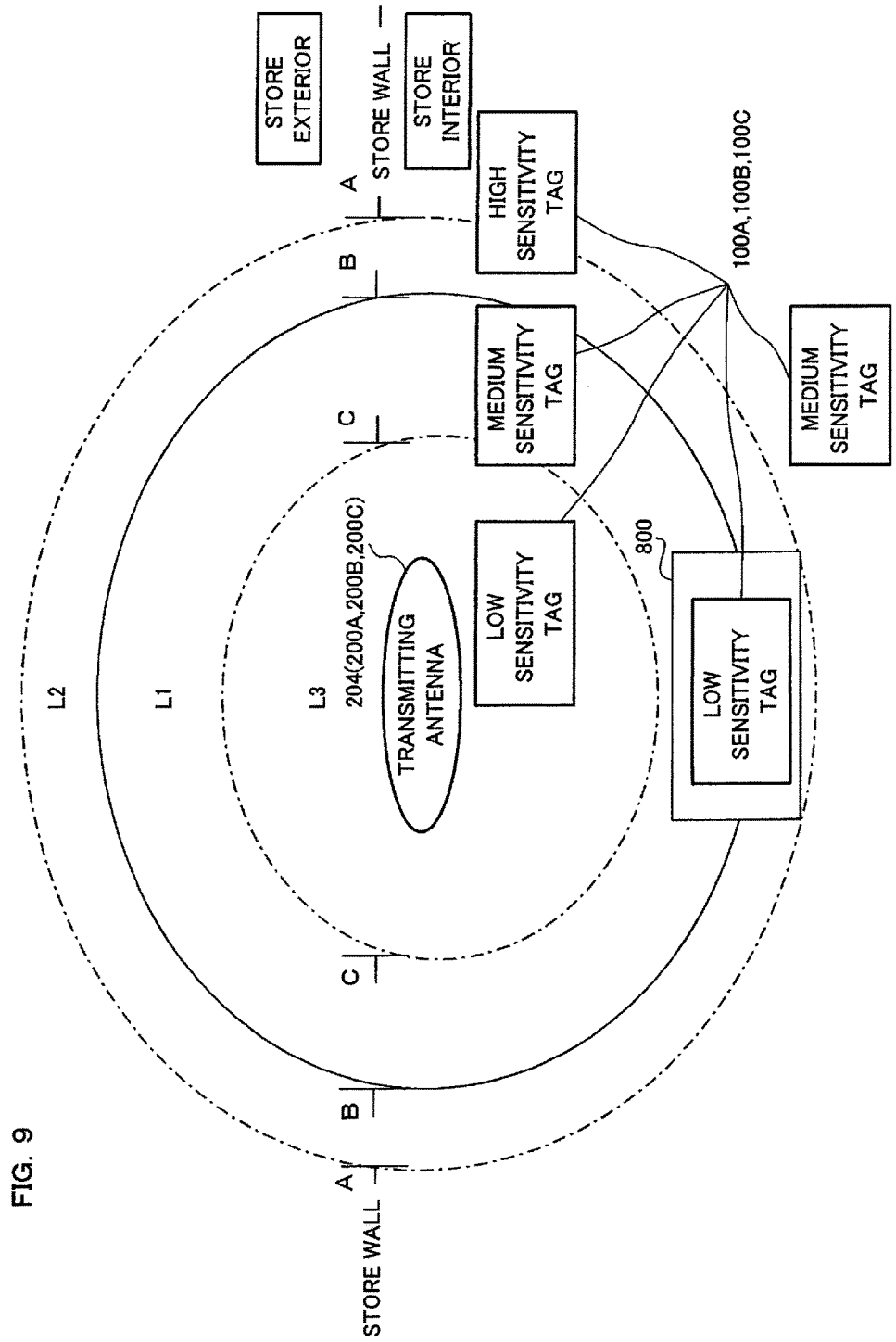
FIG. 9 is a schematic diagram showing tag issuing regions formed by tag sensitivity and a trigger signal according to the first embodiment.

FIG. 9 shows a tag-to-antenna distance (alarming distance) of each of the theft prevention tags 100A, 100B, and 100C when the transmitting antennas 204 included in the trigger signal transmission units 200A, 200B, and 200C are placed at store entrances and the theft prevention tags 100A, 100B, and 100C are set at high sensitivity, medium sensitivity, and low sensitivity.

L1 indicates a region where the entry of the medium-sensitivity theft prevention tags (medium-sensitivity tags) 100A, 100B, and 100C causes the theft prevention tag 100A to issue an alarm in response to the trigger signal from the transmitting antenna 204.

L2 indicates a region where the entry of the high-sensitivity theft prevention tags (high-sensitivity tags) 100A, 100B, and 100C causes the theft prevention tag 100A to issue an alarm in response to the trigger signal from the transmitting antenna 204.

L3 indicates a region where the entry of the low-sensitivity theft prevention tags (low-sensitivity tags) 100A, 100B, and 100C causes the theft prevention tag 100A to issue an alarm in response to the trigger signal from the transmitting antenna 204.

Example 1

Typically, if the theft prevention tags 100A, 100B, and 100C are set at medium sensitivity, the antenna tuning/power amplification units of the trigger signal transmission units 200A, 200B, and 200C are adjusted over a width b-b at a store entrance so as to adjust the output of the transmitting antenna 204. Specifically, when the medium-sensitivity theft prevention tags (medium-sensitivity tags) 100A, 100B, and 100C enter the theft warning region L1, the theft prevention tags 100A, 100B, and 100C issue the second alarm.

Example 2

If a store entrance has a width a-a larger than the width b-b of Example 1, the theft prevention tags 100A, 100B, and 100C are set at high sensitivity so as to be used for the larger width A-A. This can reduce the number of installed antennas at wide entrances, achieving a more economical system.

Example 3

In the case of a store having a small depth and a small area, a product display stand 800 near the entrance of the store is frequently placed in the region L1. In this case, if the theft prevention tag 100 with medium sensitivity is attached to a product displayed on the product display stand 800, the theft prevention tags 100A, 100B, and 100C issue the second alarm. Thus, the theft prevention tags 100A, 100B, and 100C cannot be attached to the product. In this case, the medium-sensitivity theft prevention tags (medium-sensitivity tags) 100A, 100B, and 100C are attached to products displayed remotely from the store entrance so as to issue alarms over the width b-b. For a product displayed on the product display stand 800 near the entrance of the store, the low-sensitivity theft prevention tags (low-sensitivity tags) 100A, 100B, and 100C are attached over a width c-c (minimum warning region L3), thereby improving security.

Figure 8:
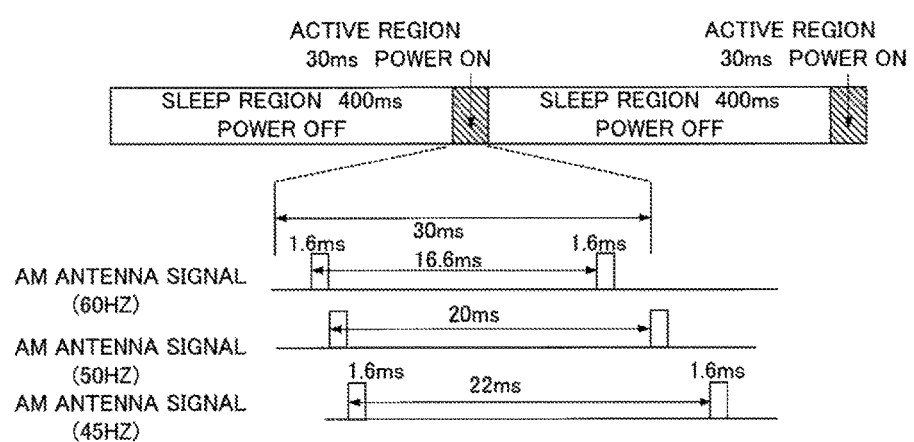
FIG. 8 is a schematic diagram showing a cycle of an active state and a sleep state of the theft prevention tag and an output cycle of the transmitting antenna according to the first embodiment.

The operations of the theft prevention tags 100A, 100B, and 100C will be discussed below. If the transmitting antennas 204 of the trigger signal transmission units 200A, 200B, and 200C are AM antennas (acoustomagneto-electric antennas), a burst trigger signal typically has a repetition output frequency of 45 Hz, 50 Hz, or 60 Hz. In each case, as shown in FIG. 8, the trigger signal (a burst carrier frequency of 58 kHz and a burst width of 1.6 ms) is transmitted in burst repetition periods of 16.6 ms (45 Hz), 20 ms (50 Hz), and 22 ms (60 Hz).

The comparator 127 used for theft prevention tags 100A, 100B, and 100C may be a comparator including an integrated circuit, for example, NCX2200 or NCV2200 of ON Semiconductor. Alternatively, the comparator 127 may be a comparator assembled into a microprocessor, for example, a comparator assembled into MSP430F1111A and so on of Texas instruments, Inc.

In order to receive a burst wave transmitted from the transmitting antenna 204 to the tag receiving antenna 126 when the comparator 127 is active, the active time of the comparator 127 needs to be longer than or equal to the burst repetition period of the burst wave.

In the present embodiment, the active period of the comparator 127 is set at 30 ms on the assumption that an AM antenna has a burst frequency of 45 Hz (burst repetition period of 22 ms).

In this configuration, the comparator power supply control part 143 intermittently supplies power to a comparator power supply terminal c of the comparator 127. For example, the comparator 127 is intermittently operated such that the comparator 127 is placed in a sleep mode for 400 ms and then becomes active (operating state) for 30 ms.

In this way, average current consumption can be reduced by setting the sleep mode of the comparator 127 longer than the active state. Thus, the comparator 127 can be used for the theft prevention tag 100, though the comparator 127 is inapplicable at normal times because of large current consumption.

Hence, the trigger signal can be received at a low signal level by using the comparator 127. This can remarkably increase the tag-to-antenna distance (alarming distance) by a factor of about 1.5 to 2.0 from that of the related art. The tag-to-antenna distance is, for example, a distance set from the transmitting antenna 204 to the theft prevention tag 100 such that the theft prevention tag 100 can issue an alarm in response to the trigger signal from the transmitting antenna 204. Thus, the size of the transmitting antenna 204 can be half or smaller than that of the related art, for example, the self-sounding theft prevention tag including a transistor serving as a trigger signal reception unit according to Patent Literature 3.

When the trigger signal transmitted from the transmitting antenna 204 in the trigger signal transmission units 200A, 200B, and 200C is received by the tag receiving antenna 126, the antenna output of the tag receiving antenna 126 is inputted to a comparator output terminal d of the comparator 127 and then the comparator 127 inputs the reception of the trigger signal by the tag receiving antenna 126 to the signal processing part 141 through the comparator output terminal d.

When the remote control signal transmitted from the remote control 125 is received by the tag receiving antenna 126, the antenna output of the tag receiving antenna 126 is inputted to the comparator 127 and then the tag receiving antenna 126 inputs the reception of the remote control signal by the tag receiving antenna 126 to the signal processing part 141 through a comparator output.

The tag control unit 140 placed on standby in the sleep mode undergoes interrupt control in response to a comparator output, e.g., the trigger signal or the remote control signal. In the signal processing part 141, an analysis is started on the comparator output, that is, an input signal (resonant circuit output) inputted from the tag receiving antenna 126 to the comparator 127. After that, the tag control unit 140 and the comparator 127 are placed in an operating state until the completion of the analysis on the input signal.

Second Embodiment

Another configuration of the trigger signal transmission units 200A, 200B, and 200C according to the first embodiment will be described as a second embodiment. In the second embodiment, the basic configurations of the present invention are identical to those of the first embodiment.

Figure 10:
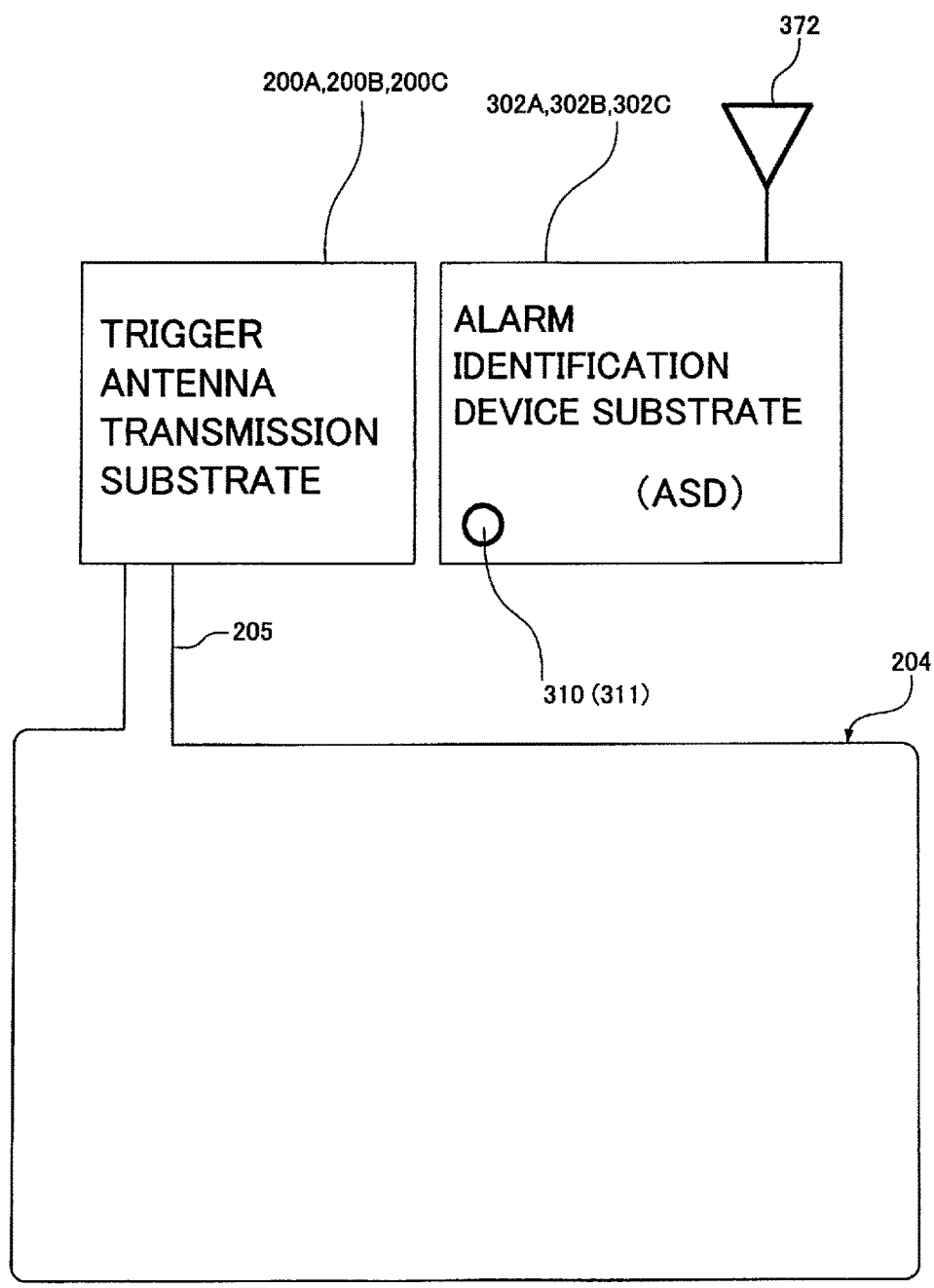
FIG. 10 is a schematic diagram showing the basic configuration of an alarm identification unit, a trigger signal transmission unit, and a transmitting antenna according to a second embodiment.

In the second embodiment, as shown in FIG. 10, trigger signal transmission units 200A, 200B, and 200C and second alarm identification devices 302A, 302B, and 302C are separated from each other. As shown in FIGS. 11 to 14, for the trigger signal transmission units 200A, 200B, and 200C, an antenna wire 205 of a transmitting antenna 204 is disposed outside of a store so as to be close to the entrance of the store. The power supply unit 201, the antenna transmitting signal generating unit 202, and the antenna tuning/power amplification unit 203 in FIG. 3, and the second alarm identification devices 302A, 302B, and 302C are disposed in the store.

Generally, marble tiles or artificial marble tiles are set at the entrance of a high-class fashion store or a department store. Thus, in the present invention, the antenna wire 205 of the transmitting antenna 204 is disposed on a floor 500 where tiles are set outside a store, at the entrances of theft warning regions A, B, and C.

However, if alarms issued by theft prevention tags 100A, 100B, and 100C are allowed around a boundary between the inside and the outside of a store and near the entrances of the theft warning regions A, B, and C, the antenna wire 205 may be disposed in a location including the boundary between the inside and the outside of the store or in a store adjacent to the boundary.

Figure 13:
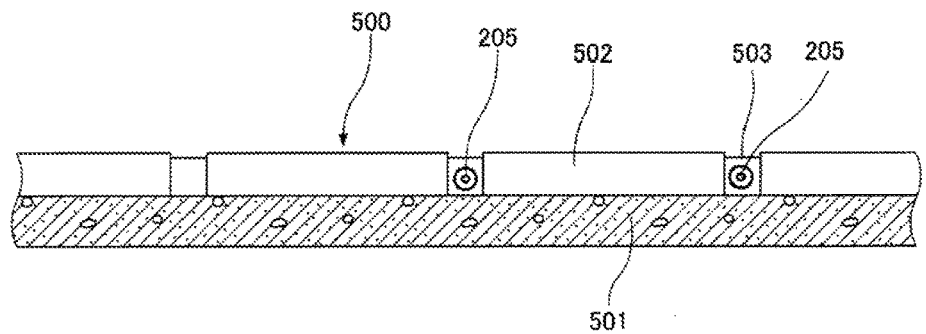
FIG. 13 is a cross-sectional view showing the layout of the loop antenna.

As shown in FIG. 13, the floor 500 includes tiles 502 set on a mortar base 501. The joint fillers of joints 503 formed between the tiles 502 are cut and the antenna wire 205 of the transmitting antenna 204 is laid in the joints 503.

Figure 11:
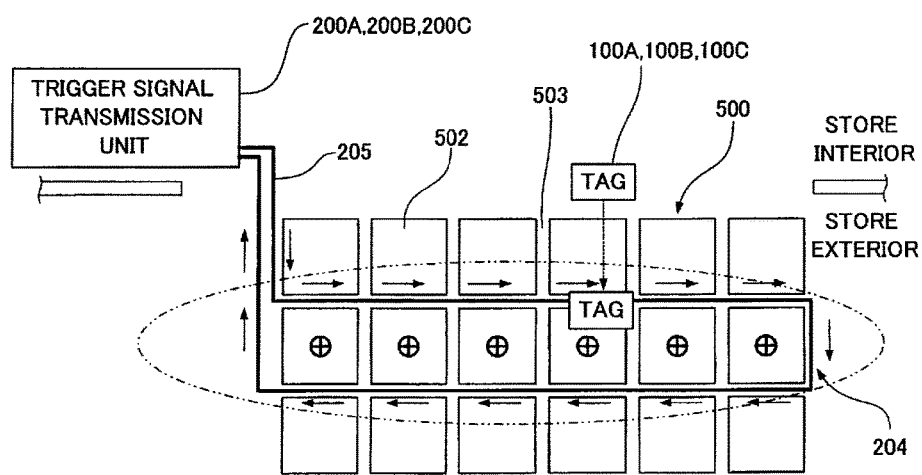
FIG. 11 is a schematic diagram showing the layout of an O-shaped loop antenna according to the second embodiment.
Figure 12:
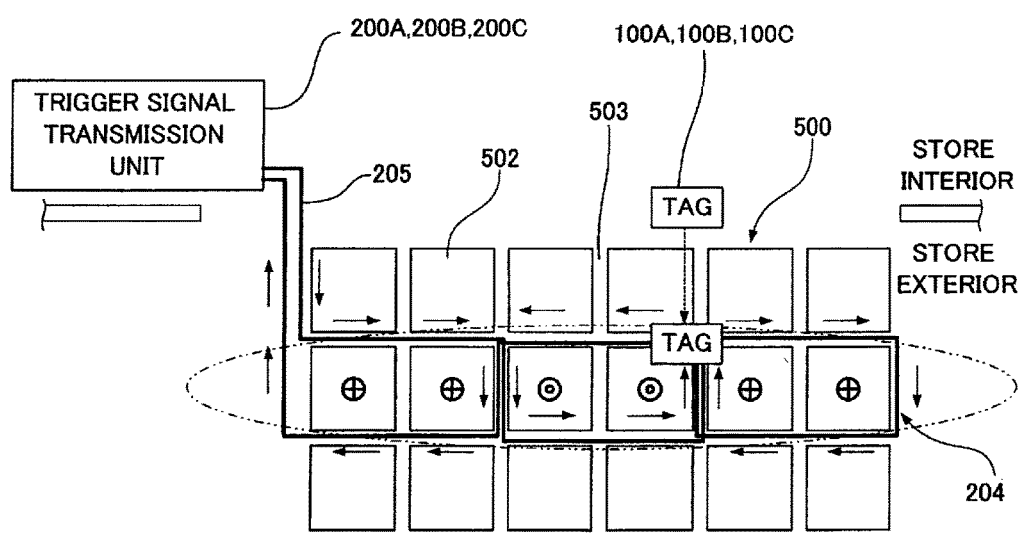
FIG. 12 is a schematic diagram showing the layout of an 8-shaped loop antenna according to the second embodiment.

FIG. 11 shows a single turn of the antenna wire 205 laid like an O loop. FIG. 12 shows a single turn of the antenna wire 205 laid like a figure-eight loop.

The number of turns of the antenna wire needs to be at least ten for the sensitivity of the theft prevention tag of the related art. Thus, the antenna wire cannot be disposed in the joints 503 that are typically 4 to 5 mm in width. In the present invention, however, the theft prevention tags 100A, 100B, and 100C can have higher sensitivity and thus even the single-turn antenna wire can sufficiently transmit the trigger signal to the theft prevention tags 100A, 100B, and 100C.

Figure 14:
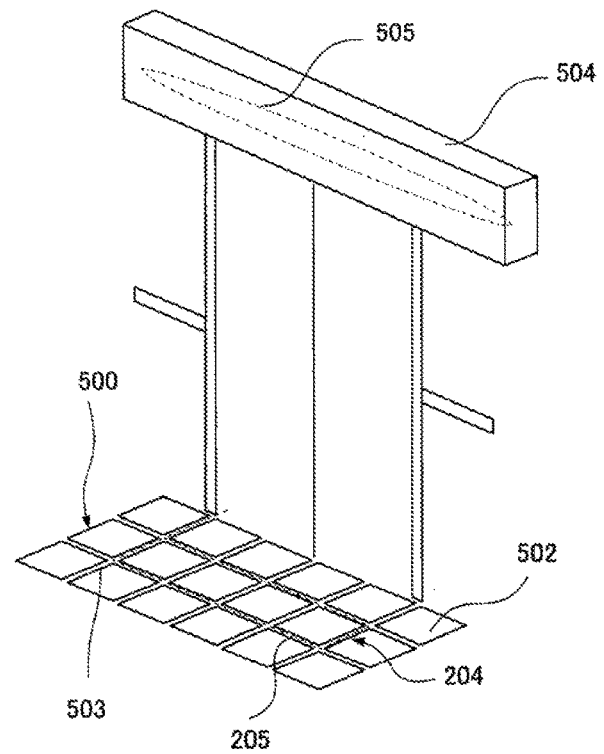
FIG. 14 is a schematic diagram showing the layout of the loop antenna.

As shown in FIG. 14, in the second embodiment, the 60 cm-square marble tiles 502 are set on the floor 500 with the joints 503 that are 4 mm in width. The antenna wire 205 having an outside diameter of 2.5 mm is embedded in the joints 503. With this configuration, the theft prevention tags 100A, 100B, and 100C issue alarms in response to the trigger signal at a height of 1.8 m from the floor 500, thereby obtaining sufficient sensitivity in practical use.

As described above, the antenna wire 205 is basically masked and thus does not spoil an aesthetic appearance near the entrance of a store serving as a theft prevention region. Moreover, the antenna wire 205 laid in the joints 503 allows durability and can eliminate obstructions, e.g., a mat that may catch a pedestrian's toe. The antenna installation 205 is also allowed after the completion of a store. This can achieve relatively easy construction. The installation of the single turn of the antenna wire 204 can suppress the antenna cost and construction cost, achieving an inexpensive configuration.

As shown in FIG. 14, a facade sign 504 disposed on a ceiling near the entrance of the theft warning region may include an antenna wire 505 of the transmitting antenna 204. In this case, the facade sign may be installed in the store as well as at the front of a building. However, the number of turns of the transmitting antenna installed in the facade sign may be increased to several turns so as to raise an antenna output.

Third Embodiment

As a third embodiment, another configuration will be described below regarding the tag receiving antenna (resonant circuit) 126 in the trigger signal reception unit 124 of the theft detection unit 120 according to the first embodiment. The basic configuration of the present embodiment is identical to that of the first or second embodiment.

Figure 15:
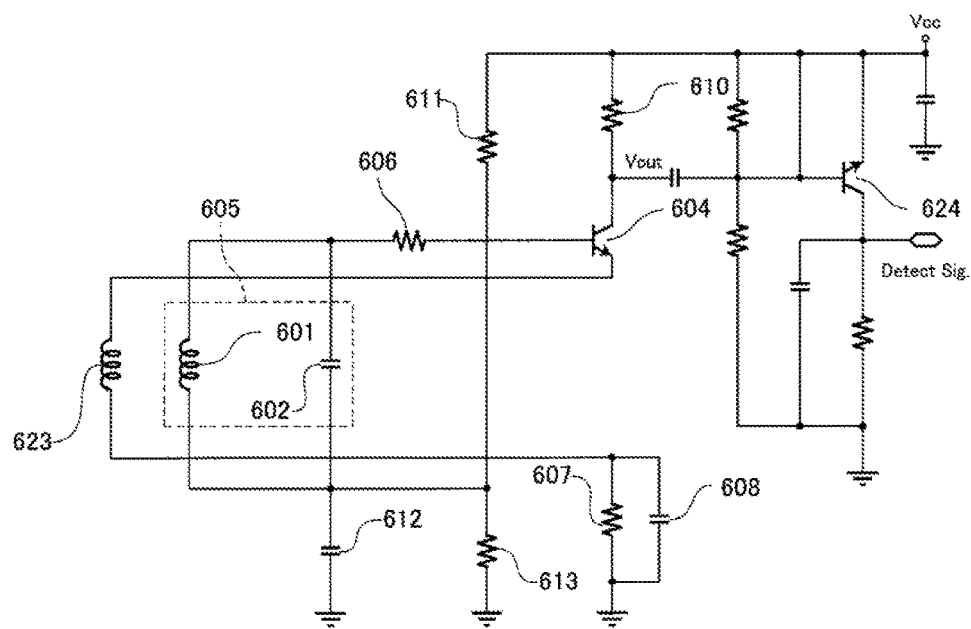
FIG. 15 shows the configuration of a tuning high-frequency receiving circuit according to a third embodiment.

In the third embodiment, as shown in FIG. 15, a resonator coil 601 and a resonator capacitor 602 constitute a resonator 605 in a high-sensitivity high-frequency signal receiving circuit constituting a tag receiving antenna (resonant circuit) 126. The resonator 605 is connected to the base of a transistor 604 via a resistor 606. A feedback coil 623 connected to the transistor 604 to perform positive feedback on the resonator 605 is connected to the emitter terminal of the transistor.

If the feedback coil is connected to the collector terminal of the transistor 604, a stray capacitance between the resonator coil 601 and the feedback coil connects the collector and base of the transistor 604. This may cause negative feedback that may interfere with the effect of positive feedback. In the present embodiment, however, the feedback coil 623 connected to the emitter terminal of the transistor suppresses the provision of negative feedback. This can achieve more effective positive feedback so as to efficiently increase the sensitivity of the receiving circuit. Moreover, a pnp transistor 624 is used to convert a received signal.

Figure 16:
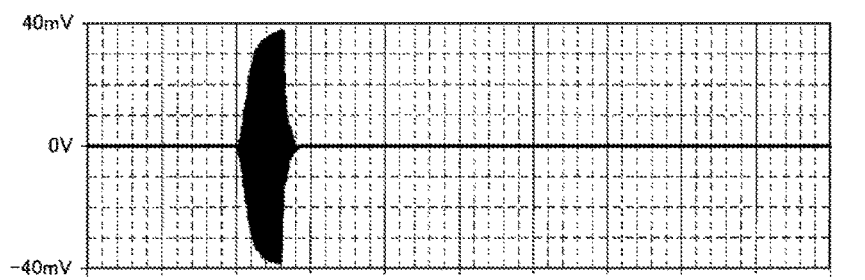
FIG. 16 shows the configuration of the tuning high-frequency receiving circuit according to the third embodiment.
Figure 16:
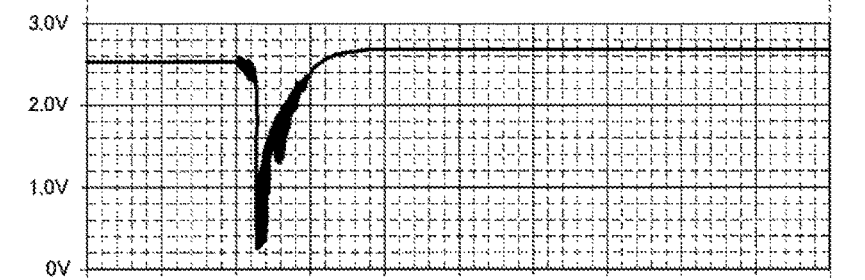
Figure 16:
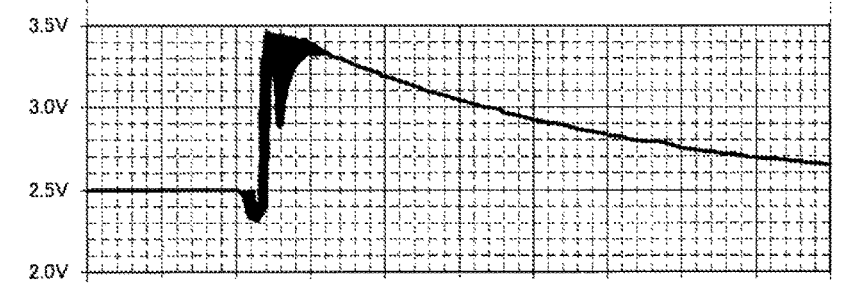
Figure 16:
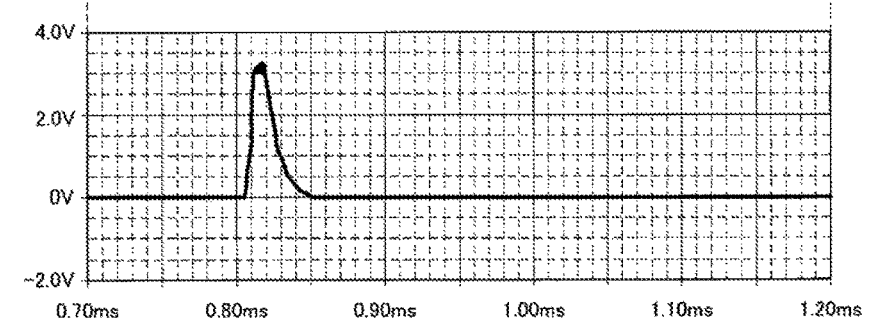

In a circuit configuration shown in FIG. 15, when the high-sensitivity high-frequency signal receiving circuit receives a high-frequency burst signal (waveform A in FIG. 16), the signal is amplified by superregeneration of the transistor 604 and then the waveform of a collector signal of the transistor 4 is outputted as indicated by a waveform B of FIG. 16. The response waveforms in FIG. 16 are set for 1-MHz signals. For an 8.2-MHz signal, the horizontal time axis may be increased by 8.2 times.

The response waveform of the collector signal gradually increases at the beginning in response to the input of the high-frequency burst signal. The saturation of the transistor 604 reduces a collector potential so as to lessen the degree of amplification. This passes a base current (waveform C in FIG. 16) for conduction of the pnp transistor 624, placing a detection signal at a high level.

Subsequently, an excitation signal is eliminated and then the collector potential (waveform D in FIG. 16) of the transistor 604 increases, returning the detection signal to an initial low level. The received signal is amplified in this way, and then a pulse signal having substantially the same duration as the excitation signal can be retrieved from the detection signal.

The capability of the circuit in FIG. 16 was examined by simulation. The excitation signal had a frequency of 1 MHz.

The output voltage of a signal generating circuit was changed with a small coupling coefficient between the coil of a signal generating circuit and the resonator coil 1, and then a circuit output detection signal was measured to decide if a pulse of at least 2.5 V can be obtained or not. The circuit had a power supply voltage of 3 V. A voltage detectable by the resonator coil 1 changed relative to the coupling coefficient between the coil of the signal generating circuit and the resonator coil 1. In the absence of positive feedback where the feedback coil 623 was removed, receiving sensitivity varied by a factor of about 3 from that in the presence of positive feedback performed as in the circuit that had undergone a bias adjustment so as not to oscillate. The detected distance of a tag signal was proportional to the square root of voltage sensitivity and thus was extended by about 1.7 times. This feature was substantially verified also in a trial circuit.

The bias voltage of the transistor 604 may be set while temperature characteristics are secured using a transistor or a diode that has the same characteristics. A bias can be automatically set using, for example, a bias control circuit that includes a DA converter configured using the DA converter of a microcomputer or the output port of the microcomputer. In a bias control circuit, it is preferable to generate a bias voltage, examine an upper limit voltage that does not cause oscillation, and set a slightly low bias voltage with an allowance according to the upper limit voltage.

In other words, a bias voltage is generated using a simple DA converter configured with a resistor network added to the DA converter output of the microcomputer or the port of the microcomputer. The bias voltage can be adjusted by setting the bias voltage so as not to successively detect received signals in the absence of the excitation signal.

Fourth Embodiment

Figure 17:
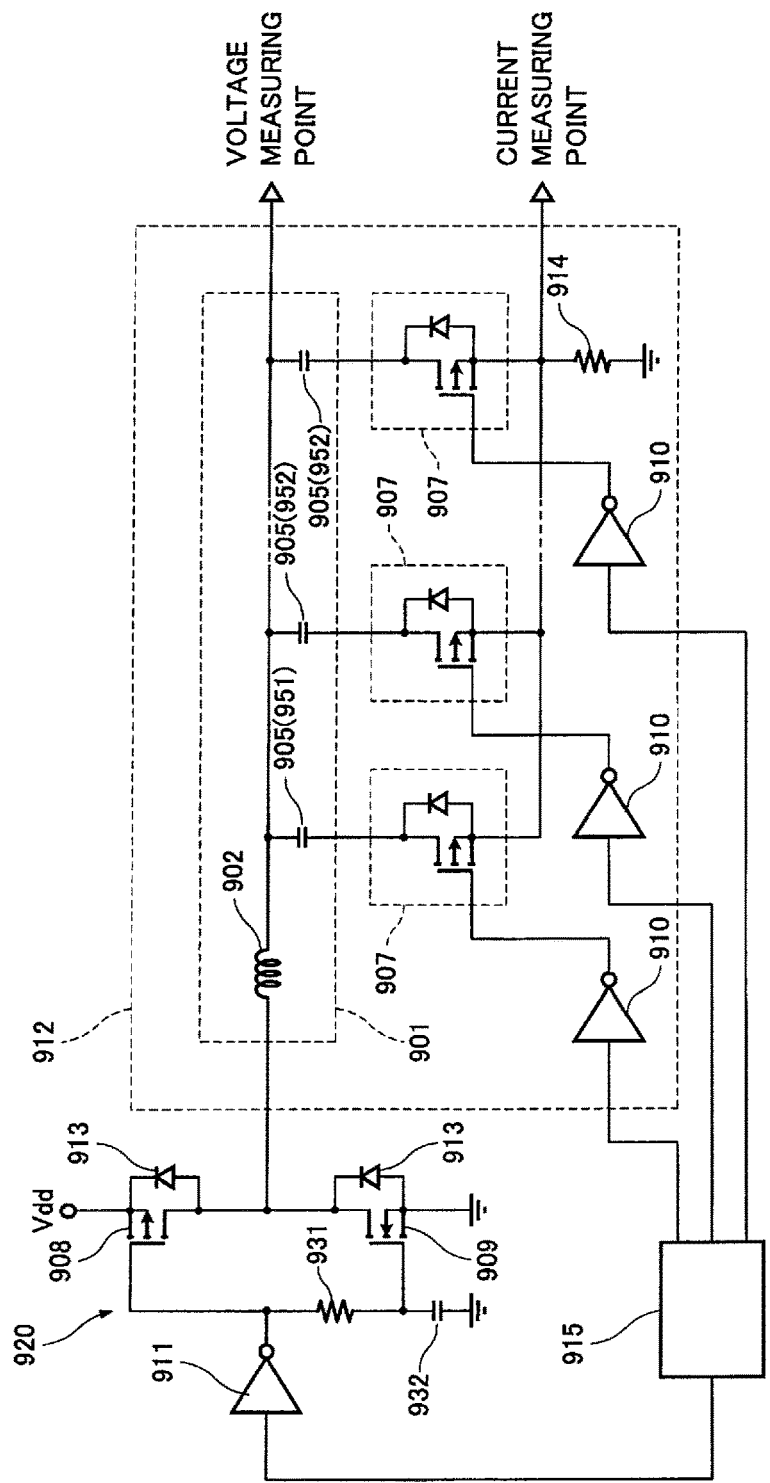
FIG. 17 is a circuit diagram for explaining the configuration of a trigger signal transmitting circuit according to a fourth embodiment.

As a fourth embodiment, the configurations of the trigger signal transmission units 200A, 200B, and 200C according to the first embodiment will be described below. As shown in FIG. 17, a trigger signal transmitting circuit according to the present embodiment includes a resonator 901 and an inverter 920 constituting a driving transistor that drives the resonator 901.

The resonator 901 includes a trigger signal transmitting antenna coil 902 and a plurality of capacitors 905 connected with different capacities to the trigger signal transmitting antenna coil 902. The capacitors 905 are connected in series with the trigger signal transmitting antenna coil 902 and are connected in parallel with each other.

In order to tune the resonator 901 at a specific frequency, the capacitors 905 include a main capacitor 951 having a main capacity and a correction capacitor 952 having a correction capacity smaller than the main capacity. At least two correction capacitors may be optionally provided and used as correction capacities for fine adjustments of tuning. If the main capacity can be selected with fine tuning, the correction capacities are not necessary.

The driving transistor may be a transistor that is activated in response to the input of a drive signal, in addition to the inverter 920. One end of the transistor is grounded and the other end of the transistor is connected to the coil 902. As shown in FIG. 17, the inverter 920 constituting a push-pull circuit has high efficiency.

The inverter 920 has a push-pull circuit configuration in which the drains of a Pch transistor 908 and an Nch transistor 909 are connected to each other and a complementary transistor input a drive signal to the gates of the Pch transistor 908 and the Nch transistor 909. In this configuration, the drive signal is inputted through a gate driver 911. The coil 902 of the resonator 901 is connected to the output terminal of the inverter 920. The inverter 920 may be a driving circuit in which a push-pull circuit is configured using the same kind of transistor. In this case, a diode 913 provided for circuit protection may be omitted in principle.

A high-frequency tuning capacitance switch circuit 912 includes the resonator 901 and a plurality of switch elements 907 provided between the capacitors 905 (951, 952) and the ground. The switch elements 907 control the electrical connection of the respective capacitors 905 (951, 952). The resonator 901 sets a resonant capacitance according to a combination of the electrically connected capacitors 905 (951, 952). An adjustment on the resonant capacitance allows tuning for various frequencies.

The main capacity of the main capacitor 951 is slightly smaller than a capacity necessary for tuning, whereas the correction capacitor 952 has a small correction capacity relative to the main capacity. The switch elements 907 are selectively controlled to electrically connect the correction capacitors 952 having necessary correction capacities, so that the correction capacity of one of the correction capacitors 952 is added to the main capacity of the main capacitor 951 or the correction capacities of the correction capacitors 952 are combined so as to add a capacity closest to the correction capacity for tuning to the main capacity, allowing tuning of frequencies.

The correction capacities include a minimum correction capacity and a correction capacity exponentiated by 2 into a correction capacity double or quadruple the minimum correction capacity. The correction capacities are combined such that the sum of the selected correction capacities is about twice as large as a capacity shortage. Thus, a correction capacity proportional to a binary number, which indicates the electric conduction of a capacity control signal, is added to the main capacity so as to allow tuning of frequencies. Thus, frequencies to be tuned can be efficiently adjusted.

In the present embodiment, the high-frequency tuning capacitance switch circuit 912 is configured such that the sources of the switch elements 907 make a common connection so as to measure a current passing through the resonator 901 and the switch elements 907 are grounded via a current measurement resistor 914. The configuration is not limited.

A current passing through the current measurement resistor 914 or the phase of a resonance signal passing through the resonator 1 can be measured using a measuring device, the AD converter of a microcomputer 915, or a timer or the like.

Figure 18:
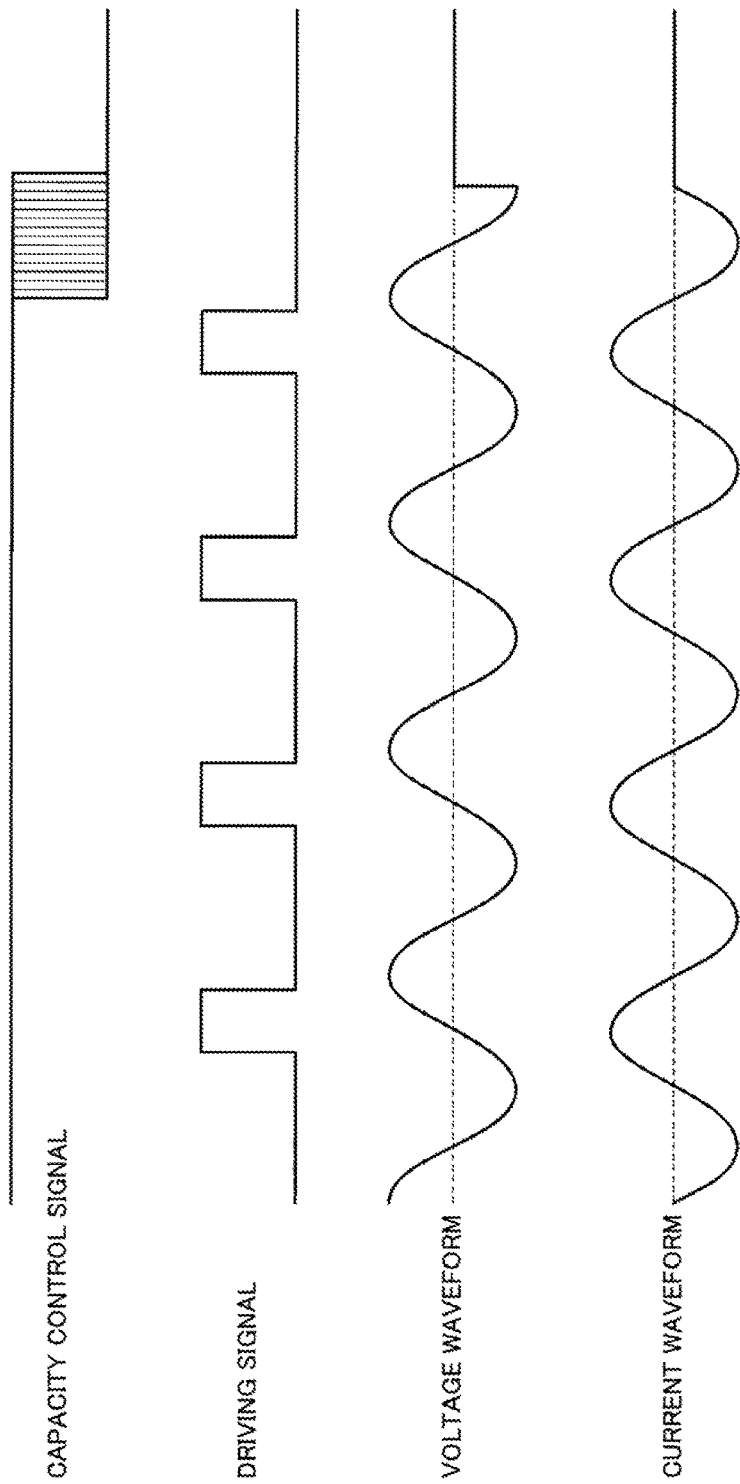
FIG. 18 is an explanatory drawing showing operations when an output is stopped in the trigger signal transmitting circuit according to the fourth embodiment.
Figure 19:
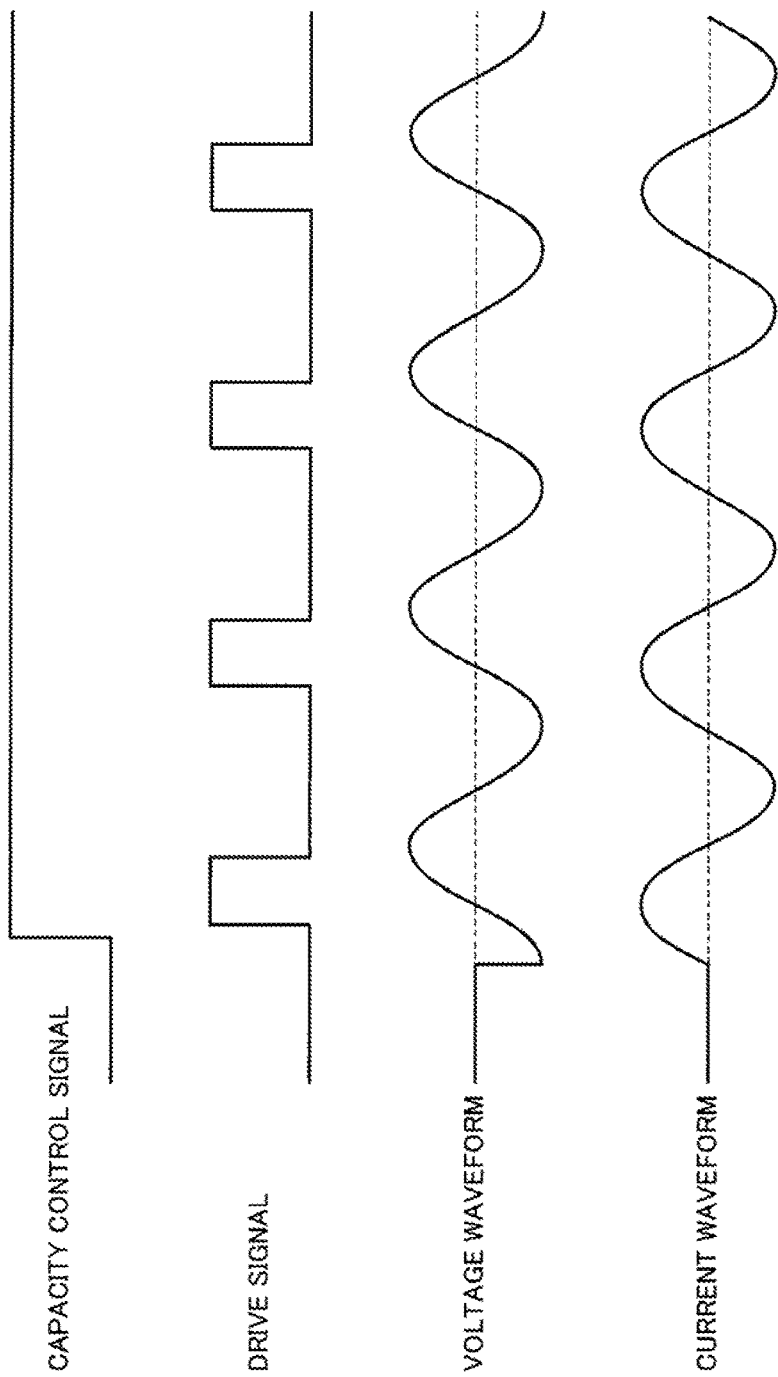
FIG. 19 is an explanatory drawing showing operations when the output is restarted in the trigger signal transmitting circuit according to the fourth embodiment.

A high-efficiency control method in this configuration will be discussed below. FIG. 18 is an explanatory drawing showing operations when an output is stopped in the trigger signal transmitting circuit of the present embodiment. FIG. 19 is an explanatory drawing showing operations when the output is restarted in the trigger signal transmitting circuit of the present embodiment.

The capacity control signal is a control signal for the capacity-control switch elements 907 that respectively control all the capacitors 905 (951, 952) used as resonant capacitances. When the capacity control signal is at a high level, the switch elements 907 that control the capacitors 905 (951, 952) used as tuning capacitances are selectively turned on to allow tuning. When the output is stopped, as shown in FIG. 18, the output of the inverter 920 acting as a driving transistor may be interrupted during the passage of a negative current through the capacity-control switch element 90 FIG. 18 shows an ample time of a half period when a control signal for controlling the driving transistor. When the output is stopped, energy is accumulated in the capacitor 905 the resonator 901.

Moreover, when the output is restarted, energy accumulated in the capacitor 905 (951, 952) is used. As shown in FIG. 19, a signal output starts fluctuating with a substantially steady amplitude from the beginning, thereby generating a high frequency signal that sharply rises. Specifically, the switch elements 907 that control the capacitors 905 (951, 952) are selectively turned on into a tuning state, and then the trigger signal transmitting circuit is operated by a drive signal delayed from the time of tuning by 90°. The trigger signal transmitting circuit for generating a high-frequency intermittent output under the control is a device that can instantly stop an output with high power supply efficiency.

In a store security system including a resonator at the same frequency as a high-frequency excitation signal, a feature is used in which a security tag continues emitting damped oscillatory waves for a while after the high-frequency excitation signal is eliminated. A decay signal is detected to allow the detection of the presence of a security tag. Thus, the use of the configuration can improve reliability in the detection of the damped oscillatory wave of a security tag in the store security system.

As described above, in the high-frequency tuning capacitance switch circuit 912 according to the present embodiment, the capacitors 905 (951, 952) including different tuning capacitances are controlled to be connected or disconnected. The capacitors 905 (951, 952) are combined so as to obtain the maximum output of the trigger signal transmitting circuit and tune the output. Tuning is enabled also by using a current waveform and a voltage waveform. The switch elements 907 are controlled so as to connect and disconnect the capacitors 905 (951, 952) within a high-frequency period, thereby generating a high-frequency trigger signal that is intermittently outputted with high efficiency and sharpness.

Fifth Embodiment

As a fifth embodiment, another configuration of the trigger signal transmission units 200A, 200B, and 200C according to the first embodiment will be described below. The basic configuration of the present invention is identical to that of the first embodiment also in the fifth embodiment.

Figure 20:
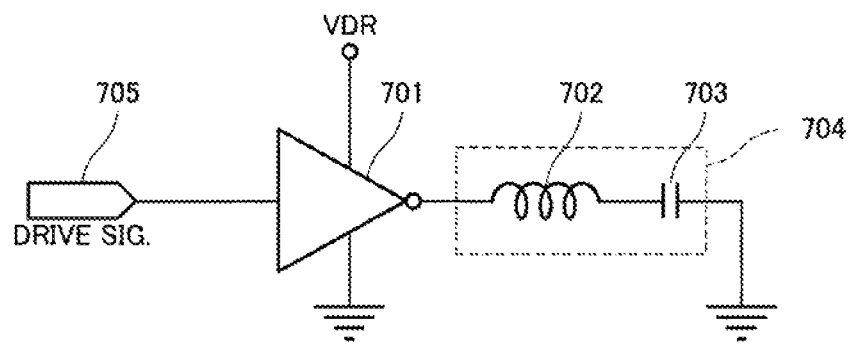
FIG. 20 shows the configuration of a high-frequency signal generating circuit according to a fifth embodiment.

In the fifth embodiment, as shown in FIG. 20, a coil 702 serving as an antenna and a capacitor 703 are connected in series to form a resonant circuit 704 serving as an antenna in a high-frequency signal generating circuit constituting trigger signal transmission units 200A, 200B, and 200C. A drive signal 705 is a pulse signal at the frequency of a high frequency signal to be generated. The output of the drive signal 705 is maximized in a duty cycle of 50% and decreases in a smaller and larger duty cycle.

A gate driver 701 receives the intermittent drive signal 705 like a rectangular pulse at a logical level from a microcomputer and so on. The gate driver 701 drives the series resonant circuit 704 substantially at the amplitude of an MOS-transistor gate-driver power supply voltage VDR. The power supply voltage VDR enables an operation at a higher voltage than the voltage of the logical circuit. Furthermore, a large current can be passed in an intermittent operation repeated in a short time, enabling an intermittent operation with a large output.

In other words, the resonant circuit 704 is driven using a gate driver for an MOS transistor and thus can be driven by a signal having a higher current or voltage than the inputted drive signal 705. In FIG. 20, the inverting gate driver 701 may be a non-inverting driver. Alternatively, the gate driver 701 may be a driver for a high-speed power control MOS transistor.

In this circuit, the gate driver for an MOS transistor drives the series resonant circuit by alternately outputting two voltages substantially equal to the power supply voltage VDR and an installation potential of 0 V in response to a pulse drive signal. This can shorten a voltage passage time, thereby reducing the power loss of the gate driver for an MOS transistor.

Since a loss is caused by an operation delay a propagation delay of the gate driver for an MOS transistor, an operation can be more efficiently performed with the speed of the gate driver for an MOS transistor. As described above, the power consumption and size of the high-frequency signal generating circuit can be reduced with high efficiency.

Sixth Embodiment

As a sixth embodiment, another configuration of the trigger signal transmission unit (antenna) 200 according to the first embodiment will be described below. Also in the sixth embodiment, the basic configuration of the present invention is identical to that of the first embodiment.

Figure 21:
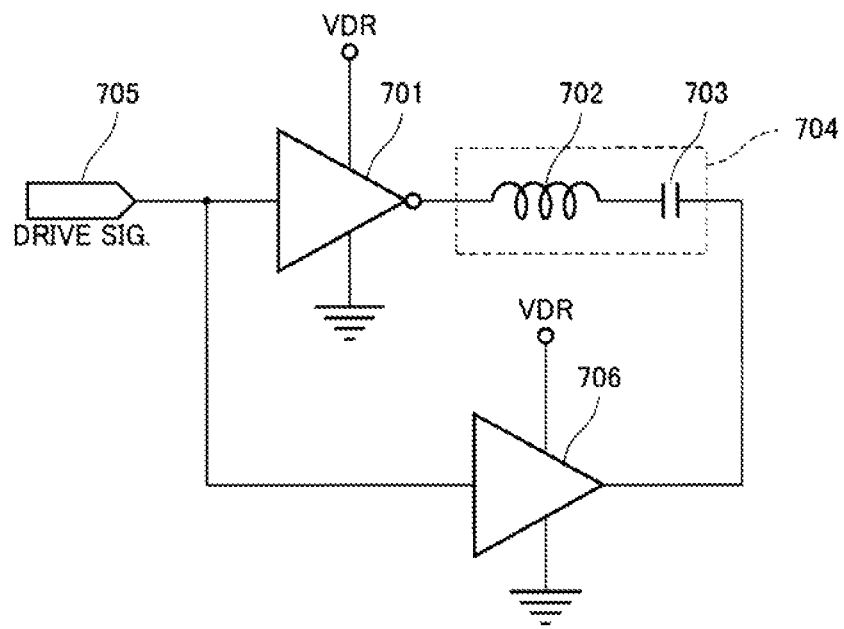
FIG. 21 shows the configuration of a high-frequency signal generating circuit according to a sixth embodiment.

In the sixth embodiment, in a high-frequency signal generating circuit constituting trigger signal transmission units 200A, 200B, and 200C, as shown in FIG. 21, two inverting and non-inverting gate drivers 701 and 706 are used and both ends of a series resonant circuit 704 are driven in opposite phases unlike in the high-frequency signal generating circuit according to the fifth embodiment. The series resonant circuit 704 is driven by a driving voltage substantially twice that of the driving circuit of FIG. 20. If only one of inverting and non-inverting gate drivers is used, an NOT circuit is inserted into the input of one of the gate drivers and a drive signal 705 is inverted, achieving a similar circuit configuration. This circuit will be referred to as a seesaw-type high-frequency signal generating circuit.

As described above, both ends of the resonant circuit 704 are driven in opposite phases, so that a power supply voltage VDR is twice that of the high-frequency signal generating circuit according to the fifth embodiment. This can obtain a larger output.

Seventh Embodiment

As a seventh embodiment, another configuration of the trigger signal transmission units 200A, 200B, and 200C according to the first embodiment will be described below. Also in the seventh embodiment, the basic configuration of the present invention is identical to that of the first embodiment.

Figure 22:
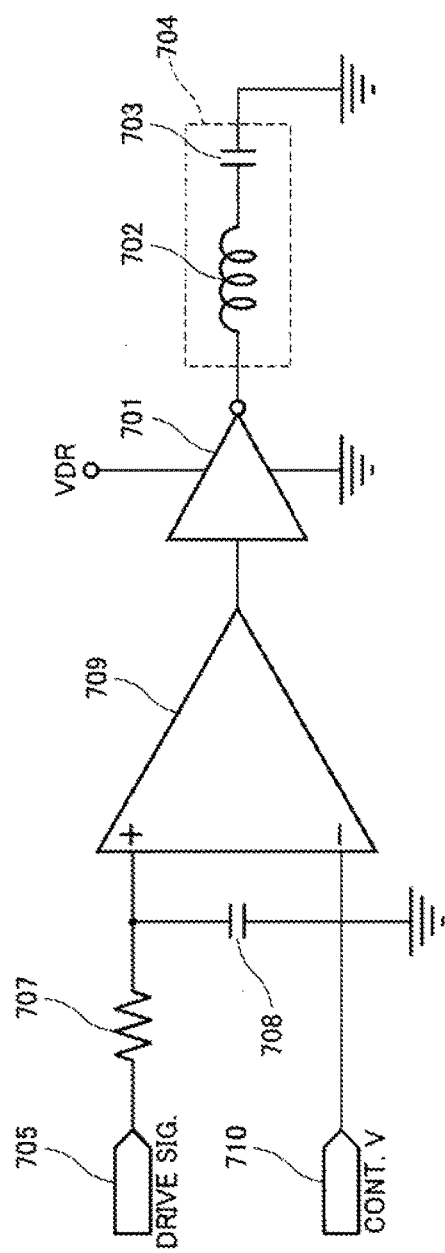
FIG. 22 shows the configuration of a high-frequency signal generating circuit according to a seventh embodiment.

In the seventh embodiment, in a high-frequency signal generating circuit constituting trigger signal transmission units 200A, 200B, and 200C, as shown in FIG. 22, a time-constant circuit including a resistor 707 and a capacitor 708 generates a signal changed at the rising and falling edges so as to be delayed from a drive signal 705 that is a pulse signal. The voltage of the generated signal and a control voltage 710 are compared by a voltage comparator 709 to generate a signal with a pulse width changed from that of the drive signal 705.

The signal outputted from the voltage comparator 709 is inputted to a gate driver 701. The pulse width of the drive signal of a resonant circuit 704 can be controlled by adjusting the voltage of the control voltage 710. The output of the drive signal is maximized in a duty cycle of 50% and decreases in a smaller or larger duty cycle. The output voltage of the high frequency signal generating circuit can be adjusted using this characteristic.

Figure 23:
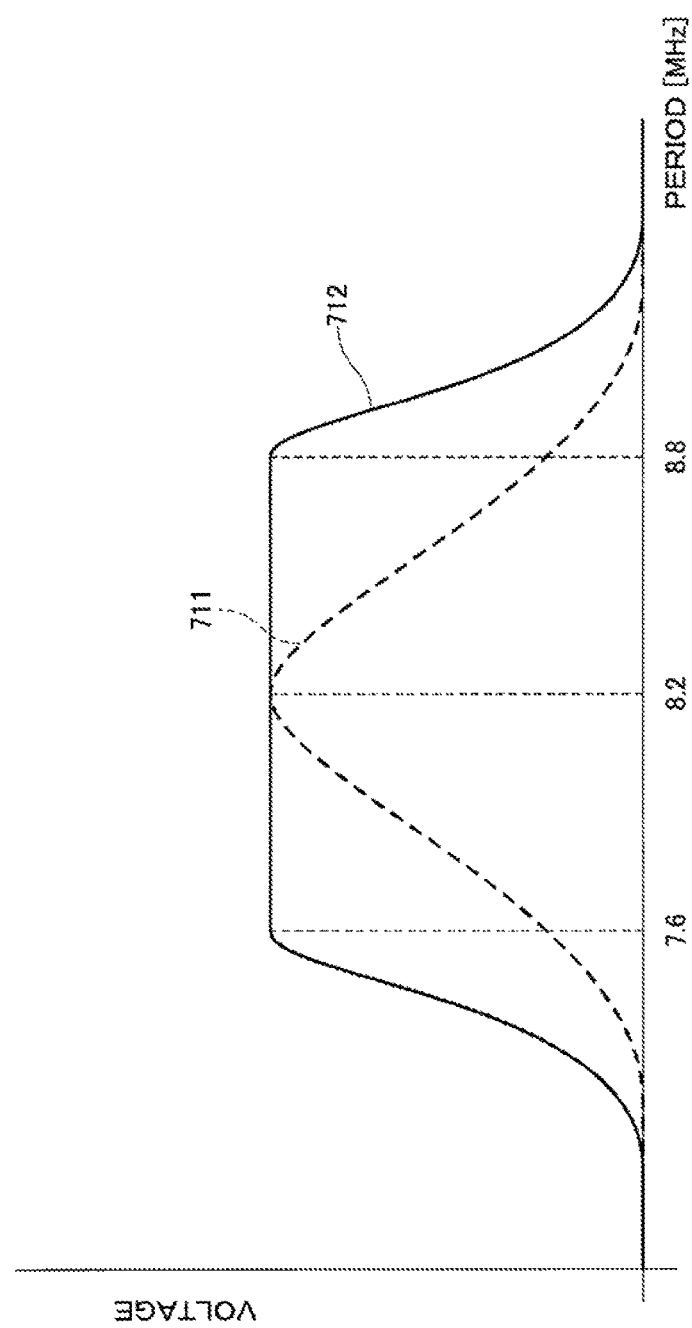
FIG. 23 shows the output frequency characteristics of the high-frequency signal generating circuit according to the seventh embodiment.

As indicated by a solid line 712 of FIG. 23, the output voltage can be kept almost constant in a specific frequency range by using this characteristic. In FIG. 23, a dotted line 711 indicates an output frequency characteristic in the high-frequency signal generating circuit not provided with an output adjustment circuit and the solid line 712 indicates an output frequency characteristic in the high-frequency signal generating circuit according to the seventh embodiment.

As indicated by the dotted line 711 of FIG. 23, the output voltage of the high-frequency signal generating circuit is maximized when a signal is outputted at a resonance frequency. The output decreases as deviating from the resonance frequency. In a store security system, the receiving circuit of a crime prevention tag for receiving the signal is not always adjusted according to the resonance frequency and thus makes variations in a certain range. Thus, as indicated by the solid line 712 of FIG. 23, the high-frequency signal generating circuit needs to output a signal with a constant magnitude while changing a frequency in the range. By using the voltage comparator 709 in the high-frequency signal generating circuit of the seventh embodiment shown in FIG. 22, a pulse width is adjusted so as to reduce the signal amplitude of a center frequency and the pulse width is controlled close to 50% such that the output increases as the output frequency deviating from the center frequency. This can keep constant the output voltage in a specific frequency range.

The invention claimed is:

1. A sound recognition theft prevention system comprising:
    a self-sounding theft prevention tag that is attached to an object disposed in a theft warning region and issues a specific alarm when a theft occurs;
    a trigger signal transmission unit that transmits a trigger signal near an entrance of the theft warning region; and
    an alarm identification unit that identifies the alarm issued by the self-sounding theft prevention tag,
    the self-sounding theft prevention tag comprising an alarm issuing unit capable of issuing a first alarm and a second alarm as the specific alarm; an anomaly detection switch unit that opens or closes an electric circuit in response to a theft; a trigger signal reception unit that detects the trigger signal transmitted from the trigger signal transmission unit; and a tag control unit that causes the alarm issuing unit to issue the first alarm at activation of the anomaly detection switch unit and causes the alarm issuing unit to issue the second alarm when the trigger signal reception unit detects the trigger signal,
    wherein the alarm identification unit recognizes at least one of the two alarms issued by the self-sounding theft prevention tag to determine occurrence of theft.

2. The sound recognition theft prevention system according to claim 1, wherein the self-sounding theft prevention tag and the alarm identification unit are provided in each theft warning region, the alarm issuing unit of the self-sounding theft prevention tag issues the specific alarm with a different sound feature for each theft warning region, and the alarm identification unit only recognizes the specific alarm issued by the self-sounding theft prevention tag disposed in the corresponding theft warning region, to determine the occurrence of theft in the corresponding theft warning region when the specific alarm is recognized.

3. The sound recognition theft prevention system according to claim 2, wherein the self-sounding theft prevention tag has a different tag identification code for each theft warning region, and the specific alarm issued by the alarm issuing unit has a different sound feature for each tag identification code.

4. The sound recognition theft prevention system according to claim 3, wherein the self-sounding theft prevention tag has a tag-identification code storage part where the tag identification code is changeably stored, and the alarm issuing unit issues an alarm specific to the tag identification code according to the tag identification code stored in the tag-identification code storage part.

5. The sound recognition theft prevention system according to claim 1, wherein the tag control unit includes a signal processing part that recognizes whether an input signal has been received from the anomaly detection switch unit or the trigger signal reception unit, and decides whether to issue the first alarm or the second alarm; and an alarm control part that outputs, to the alarm issuing unit in response to an instruction of the signal processing part, one of a first alarm drive signal for issuing the first alarm and a second alarm drive signal for issuing the second alarm.

6. The sound recognition theft prevention system according to claim 1, wherein the alarm identification unit includes a first alarm identification device that recognizes the first alarm issued by the self-sounding theft prevention tag to determine occurrence of theft in the theft warning region.

7. The sound recognition theft prevention system according to claim 1, wherein the alarm identification unit includes a second alarm identification device that recognizes the second alarm issued by the self-sounding theft prevention tag to determine occurrence of theft near the entrance of the theft warning region.

8. The sound recognition theft prevention system according to claim 1, wherein the alarm identification unit includes a first alarm identification device that recognizes the first alarm issued by the self-sounding theft prevention tag to determine occurrence of theft in the theft warning region, and a second alarm identification device that recognizes the second alarm issued by the self-sounding theft prevention tag to determine occurrence of theft near the entrance of the theft warning region.

9. The sound recognition theft prevention system according to claim 1, wherein the alarm identification unit includes a microphone that receives an alarm issued by the self-sounding theft prevention tag, and a sound duct that guides an alarm to the microphone, the sound duct having an effective length in a range of $1/4 \pm 1/12$ of a wavelength of an alarm.

10. The sound recognition theft prevention system according to claim 1, wherein the trigger signal reception unit of the self-sounding theft prevention tag includes: a tag receiving antenna that receives the trigger signal; and a comparator that transmits, to the tag control unit, a signal indicating reception of the trigger signal by the tag receiving antenna, and the tag control unit includes a comparator power supply control part that controls power supplied to the comparator and intermittently operates the comparator.

11. The sound recognition theft prevention system according to claim 10, wherein the tag control unit includes a sensitivity adjustment unit that changes a comparative threshold voltage to be inputted to the comparator and sets sensitivity of the trigger signal reception unit of the self-sounding theft prevention tag.

12. The sound recognition theft prevention system according to claim 1, wherein the trigger signal reception unit of the self-sounding theft prevention tag includes: a resonator where a resonator coil and a resonator capacitor are connected in parallel; a transistor whose base terminal is connected to the resonator; and a feedback coil connected to an emitter terminal of the transistor, and resonance of the resonator activates the transistor so as to perform positive feedback on the resonator by means of the feedback coil.

13. The sound recognition theft prevention system according to claim 12, wherein the trigger signal reception unit of the self-sounding theft prevention tag includes a bias control circuit that controls a bias voltage supplied to the transistor.

14. The sound recognition theft prevention system according to claim 1, wherein the trigger signal transmission unit includes: a resonant circuit that is composed of a coil and a capacitor; and a first gate driver for a power control MOS transistor, the first gate driver receiving a first drive signal and outputting a second drive signal for driving the resonant circuit, and at least one of a voltage and a current of an output signal from the first gate driver is higher than that of the first drive signal.

15. The sound recognition theft prevention system according to claim 14, wherein the trigger signal transmission unit includes a second gate driver disposed on one end of the resonant circuit with the first gate driver connected to an opposite end, the second gate driver having a characteristic identical to that of the first gate driver in opposite phases.

16. The sound recognition theft prevention system according to claim 15, wherein the trigger signal transmission unit includes two voltage comparators connected to input terminals of the first gate driver and the second gate driver, respectively, the first drive signal is inputted to one input terminal of each of the voltage comparators through a time-constant circuit including a resistor and a capacitor, a control voltage is inputted to the other input terminal, a duty ratio of the second drive signal is adjusted by controlling the control voltage, and the adjustment controls an output voltage.

17. The sound recognition theft prevention system according to claim 14, wherein the trigger signal transmission unit includes a voltage comparator connected to an input terminal of the first gate driver, the first drive signal is inputted to one input terminal of the voltage comparator through a time-constant circuit including a resistor and a capacitor, a control voltage is inputted to the other input terminal of the voltage comparator, a duty ratio of the second drive signal is adjusted by controlling the control voltage, and the adjustment controls an output voltage of the first gate driver.

18. The sound recognition theft prevention system according to claim 1, wherein the trigger signal transmission unit includes an antenna wire that transmits, near the entrance of the theft warning region, the trigger signal to the theft prevention tag, the antenna wire being laid in a single turn in a floor near the entrance of the theft warning region.

19. The sound recognition theft prevention system according to claim 1, wherein the trigger signal transmission unit includes an antenna wire that transmits, near the entrance of the theft warning region, the trigger signal to the theft prevention tag, the antenna wire being disposed in a facade sign near the entrance of the theft warning region.

20. The sound recognition theft prevention system according to claim 1, further comprising a remote control that transmits a remote control signal for controlling the tag control unit of the self-sounding theft prevention tag, the remote control transmitting, as the remote control signal, a sensitivity control signal for instructing a change of a comparative threshold voltage to be inputted to a comparator of a sensitivity adjustment unit.

\* \* \* \* \*